(12) United States Patent
Shatzkes

(10) Patent No.: US 12,082,709 B2
(45) Date of Patent: Sep. 10, 2024

(54) CHAIR-MOUNTABLE SCREEN

(71) Applicant: Gig Gear LLC, Brooklyn, NY (US)

(72) Inventor: Daniel Jeremy Shatzkes, Brooklyn, NY (US)

(73) Assignee: GIG GEAR LLC, Brooklyn, NY (US)

( * ) Notice: Subject to any disclaimer, the term of this patent is extended or adjusted under 35 U.S.C. 154(b) by 523 days.

(21) Appl. No.: 17/351,555

(22) Filed: Jun. 18, 2021

(65) Prior Publication Data

US 2021/0393038 A1    Dec. 23, 2021

Related U.S. Application Data

(60) Provisional application No. 63/041,483, filed on Jun. 19, 2020.

(51) Int. Cl.
*A47C 7/62*      (2006.01)
*H04N 5/222*    (2006.01)

(52) U.S. Cl.
CPC .............. *A47C 7/62* (2013.01); *H04N 5/222* (2013.01)

(58) Field of Classification Search
CPC .... A47C 7/62; A47C 7/64; A47C 7/66; H04N 5/222
See application file for complete search history.

(56) References Cited

U.S. PATENT DOCUMENTS

| | | | |
|---|---|---|---|
| D496,322 S * | 9/2004 | Farney | D12/401 |
| D618,948 S | 7/2010 | Bovay et al. | |
| 7,891,733 B1 * | 2/2011 | Clarke | B60R 11/00 211/85.3 |
| D634,152 S * | 3/2011 | Natkin | D6/611 |
| D700,460 S | 3/2014 | Bovay et al. | |
| D737,600 S | 9/2015 | Bovay et al. | |
| 10,758,053 B2 * | 9/2020 | Bovay | A47G 5/00 |
| 11,229,295 B2 * | 1/2022 | Bovay | A47C 7/62 |
| D966,748 S * | 10/2022 | Shatzkes | D6/611 |
| 2005/0146196 A1 * | 7/2005 | Cassaday | A47C 7/62 297/463.1 |
| 2014/0290879 A1 * | 10/2014 | De La Fuente Sanchez | A47C 7/62 160/368.1 |

* cited by examiner

*Primary Examiner* — Beth A Stephan
(74) *Attorney, Agent, or Firm* — Greenblum & Bernstein, P.L.C.

(57) ABSTRACT

A chair-mountable screen including a screen frame defining a perimeter of the screen, at least one screen material supported by the screen frame, and a strap arrangement fastened on each of the at least one screen material. The strap arrangement is adjustably-attachable to the screen to create a selectively-sized gap between the screen material and the strap arrangement.

18 Claims, 19 Drawing Sheets

CHAIR-MOUNTABLE SCREEN

CROSS REFERENCE TO RELATED APPLICATION

The present application claims the benefit of U.S. Provisional Application No. 63/041,483, filed Jun. 19, 2020, the contents of which are expressly incorporated herein reference in its entirety.

BACKGROUND OF THE DISCLOSURE

1. Field of the Disclosure

This disclosure relates to a chair-mountable screen, and more particularly, to a chair-mountable screen for obscuring a background, for example, when on camera.

2. Description of the Related Art

Many people work from home or other locations outside of a professional work environment and are required to use a webcam or other camera to video conference, telecommute, and/or attend virtual meetings, for example. Often the location or environment where that person is currently situated may not be suitable or desirable for a professional or work video meeting (for example, a messy bedroom, a public cafe, a room in which children are playing, etc.).

Thus, a chair-mounted screen may be used to obscure the background in order to provide a suitable view for a video conference. A chair-mounted background screen may slide onto the back of a chair and is operable to block out from the view of the camera what is situated or taking place behind the individual sitting in the chair.

Existing chair-mounted screens, however, suffer from a myriad of deficiencies, including an inability to utilize at all with some chairs, an inability to utilize effectively on a wide-variety of chairs, a difficultly of maintaining the screen positioned in an optimal obscuring location; and inability to adapt the screen for different screen uses. For example, existing chair-mounted screens provide inferior mounting capabilities and/or require additional components to keep the screen from tilting backwards due to the shape of the screen and/or the design of the straps.

Therefore, there is a need for an improved chair-mounted screen that does not suffer from the above-noted deficiencies.

SUMMARY OF THE EMBODIMENTS OF THE DISCLOSURE

The disclosure relates to a chair-mountable screen that includes adjustable features enabling the screen to be effectively utilized on a wide-variety of chair styles and sizes, while maintaining the screen positioned in an optimal obscuring location. Implementing aspects of the disclosure provides a chair-mounted screen that is more stable and more effective at staying upright on a wider variety of chairs than any prior alternatives.

Embodiments of the disclosure are directed to a chair-mountable screen for obscuring the background when on camera with an improved strap design, for example, having a fixed length but including hook and loop fastening material between the straps and the screen that can be open and closed to allow for wider or narrower chair backs, without having to rely on elastic material that can warp the shape of the screen. Embodiments of the disclosure also include a "horizontal" strap having an "X" shape with more surface area as opposed to a single horizontal strap. By implementing aspects of the disclosure, the X-shaped strap provides additional stability for the screen to prevent it from tilting backwards, and also allows the screen to be mounted on irregular shaped chair backs. Additionally, this screen is shaped and designed to be flatter on top, helping to further negate the top heaviness to prevent the screen from tilting backwards. Additionally, in accordance with aspects of the disclose, in embodiments, the screen includes straps on both sides of the screen, allowing both sides of the scree to be used, e.g., as a back drop. Each side of the screen may be made of its own piece of fabric, usually, but not necessarily required to be, of different colors. Additionally, by having two layers of fabric, the screen also ensures that far less light can seep through from behind the screen.

Aspects of the present disclosure are directed to a chair-mountable screen including a screen frame defining a perimeter of the screen, at least one screen material supported by the screen frame, and a strap arrangement fastened on each of the at least one screen material. The strap arrangement is adjustably-attachable to the screen to create a selectively-sized gap between the screen material and the strap arrangement In embodiments, the strap arrangement is non-elastic.

In additional embodiments, the strap arrangement has a fixed length.

In further embodiments, the strap arrangement comprises a vertical strap and a horizontally-arranged strap, wherein the vertical strap includes an upper terminal end fixedly attached to the screen.

In embodiments, the horizontally-arranged strap is an X-shaped strap, having a center region and four terminal arms extending from the center region.

In some embodiments, the X-shaped strap is fixedly attached to the screen material at distal ends of each of the four terminal arms.

In other embodiments, the X-shaped strap is fixedly attached to the screen material at distal ends of only two of the four terminal arms.

In additional embodiments, the X-shaped strap is selectively releaseably attached to the screen material along portions of each of the four terminal arms inwardly of the distal ends.

In further embodiments the X-shaped strap is selectively releaseably attached to the screen material via hook and loop fastener.

In embodiments, the X-shaped strap includes a fastening material arranged on an outward surface of the center region, the vertical strap includes a corresponding fastening material extending from below the upper terminal end towards a lower terminal end of the vertical strap on an inner facing surface of the vertical strap, and the fastening material and corresponding fastening material are operable to fasten to one another to retain the vertical strap in position on the X-shaped strap.

In yet additional embodiments, the vertical strap is selectively releaseably attached to the screen material below the upper terminal end via hook and loop fastener.

In embodiments, the screen includes a pocket arranged on the screen material at a lower end of the screen.

In additional embodiments, the at least one screen material comprises two screen materials, each with a respective strap arrangement.

In further embodiments, the respective strap arrangements are fastened to each other through the two screen materials.

In certain embodiments, the two screen materials have differing screen properties from one another.

In additional embodiments, the perimeter of the screen has a guitar pick shape having a wider upper end and a narrower lower end.

In embodiments, the screen further comprises at least one hanging arrangement at an upper end of the screen, wherein the hanging arrangement is operable to support the screen in a hanging orientation.

In additional embodiments, the selectively-sized gap is formed by the X-shaped strap being selectively attached to the screen material along certain portions of each of the four terminal arms inwardly of the distal ends.

In further embodiments, the X-shaped strap is operable to form the selectively-sized gap such that the X-shaped strap applies tension force to the screen in a direction approximately orthogonal to the screen.

Additional aspects of the present disclosure are directed to a method of configuring a chair-mountable screen for mounting to a chair including a screen frame defining a perimeter of the screen, at least one screen material supported by the screen frame, and a strap arrangement fastened on each of the at least one screen material. The strap arrangement comprises a vertical strap and a horizontally-arranged X-shaped strap having a center region and four terminal arms extending from the center region, wherein the X-shaped strap is includes distal ends at each of the four terminal arms and portions of each of the four terminal arms inwardly of the distal ends are selectively releaseably attachable to the screen material via hook and loop fastener. The strap arrangement is operable to create a selectively-sized gap between the screen material and the strap arrangement. The method includes forming the, selectively-sized gap by fastening select portions of one or more of the four terminal arms inwardly of the distal ends to the screen via the hook and loop fastener.

BRIEF DESCRIPTION OF THE DRAWINGS

The novel features which are characteristic of the disclosure, both as to structure and method of operation thereof, together with further aims and advantages thereof, will be understood from the following description, considered in connection with the accompanying draw s which embodiments of the disclosure are illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the embodiments of the disclosure in conjunction with the following exemplary and non-limiting drawings wherein.

Figure 1:
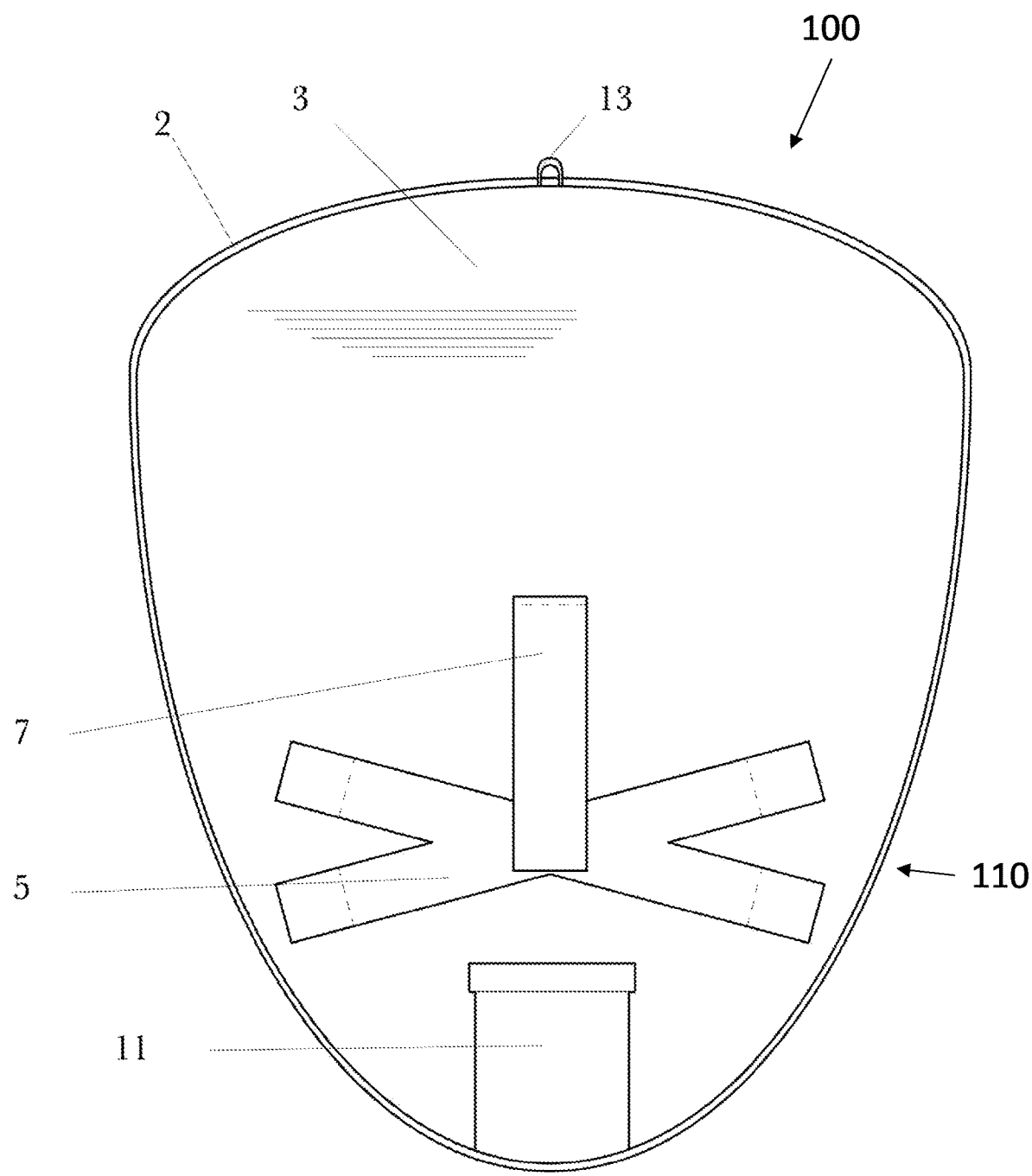
FIG. 1 shows an exemplary chair-mounted screen in a "closed" position in accordance with aspects of the disclosure.

Reference numbers refer to the same or equivalent parts of the present disclosure throughout the various figures of the drawings.

DETAILED DESCRIPTION OF THE EMBODIMENTS OF THE DISCLOSURE

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the embodiments of the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms a "an," and "the" include the plural reference unless the context clearly dictates otherwise. For example, reference to "a magnetic material" would also mean that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the indefinite article "a" indicates one as well as more than one and does not necessarily limit its referent noun to the singular.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely. The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of", so that for instance "a composition comprising a compound A" may also (essentially) consist of the compound A.

The various embodiments disclosed herein can be used separately and in various combinations unless specifically stated to the contrary.

This disclosure relates to a chair-mounted screen, and more particularly, to a chair-mounted screen for obscuring a background, for example, when on camera. As noted above, existing chair-mounted screens suffer from a myriad of deficiencies, including an inability to utilize at all with some chairs, an inability to utilize effectively on a wide-variety of chairs, a difficultly of maintaining the screen positioned in an optimal obscuring location; and inability to adapt the screen for different screen uses.

For example, existing chair-mounted screens are limited in what size chair back they can fit on due to the size of the securing straps. The straps on existing chair-mounted screens offer a single horizontal strap and single vertical strap for sliding onto the back of the chair. These straps, when fixed in their length, limit the width of the chair back that the straps can fit on. For example, securing straps sized to fit smaller chairs may not be suitable for securing to a larger seat, and vice versa. Additionally, straps may be an elastic material that can stretch so as to fit different width chair backs in order to alleviate this problem (e.g., to increase the size range of seats that can be accommodated). With elastic straps, however, the tension from the stretched elastic, e.g., if pulled too tightly, can pull on the fabric of the screen, and thus warp the shape of the screen. Thus, for example, based on the size of the seat to which the screen is attached, the screen may be warped, which may be undesirable.

To address this problem, in accordance with aspects of embodiments of the present disclosure, the straps are adjustable in a manner so that the screen may securely-mountable to a wide variety of chair types and sizes without warping the screen. The embodiments of the disclosure have an improved strap design with a fixed length and include hook and loop fastening material between the straps and the screen that can be open and closed to allow for wider or narrower chair backs. For example, with embodiments of the present disclosure, the securing strap(s) may have fixed length with ends secured (e.g., stitched, adhesively-bonded, thermally-bonded, etc.).

In accordance with aspects of the disclosure, however, the screen includes a strap free-length adjustment mechanism, which allows a user to adjust an amount of available free-length of the strap, which is available to wrap around a chair (and adjust an amount of fixed length of the strap, which is fixed to the screen, and thus not available to wrap around a chair). In embodiments, the strap free-length adjustment mechanism includes respective portions of hook and loop fastening material arranged on the straps and corresponding regions of the screen.

By implementing these aspects of the disclosure, a user can attain a secure attachment of the screen to the chair without having to rely on elastic material that can warp the shape of the screen. Moreover, by providing the ability to anchor the strap as close as possible to the body of the chair, the amount of pull on the screen that could induce a warp on the screen is reduced (for example, as compared to a screen with only strap anchor points of a fixed length and at a fixed location). By implementing this aspect of the disclosure, a user may adjust the straps of the screen in a quick and effective manner, for example, when arranging the screen on a particular chair, so that the screen can securely mount to the chair.

Additionally, embodiments of the disclosure utilize a strap arrangement having two straps in an "X" shape that provides additional stability for the screen (for example, as compared to a screen with a single horizontal strap) to keep it from tilting backwards, and also allows for mounting o irregular shaped chair backs.

FIG. 1 shows an exemplary chair-mounted screen 100 in a "closed" position accordance with aspects of the disclosure. As shown in FIG. 1, a bendable material (e.g., spring steel) (not shown) may be bent into shape to form a frame 1 of the chair-mounted screen 100. As shown in FIG. 1, in accordance with aspects of the disclosure, embodiments of the disclosure have "guitar pick" shape. The screen 100 works optimally when it can completely fill up the view of the webcam employed by the user. This is desirable at approximately head height. However, the width of coverage desired at head height is not necessary in the portions of the screen where the camera is not sensing. Thus, in accordance with aspects of the disclosure, by providing the widest section of the screen at the top, the present disclosure ensures the user will slide the screen onto the chair low enough to allow for an equal weight balance between the top and the bottom, working in tandem with the strap system to keep the screen upright (as opposed to tilting backwards). In addition, for those users that are mounting the screen onto a chair that swivels, the narrower width at the lower regions of the screen are operable to prevent the screen from knocking into a desk or table or knocking things off of a desk or table, for example. While the exemplary embodiment of FIG. 1 depicts an "upside-down egg" shape or "guitar pick" shape, it should be understood that embodiments of the disclosure may utilize any shape, regular or irregular.

A "front" material 3 and a "rear" material 4 (which may be fabrics, and may be different from one another) are shaped (e.g., cut) to fit precisely inside the frame 1. A securing material 2 (which may be a fabric) may be arranged and fastened to the frame 1 to pull front material 3 and rear material 4 taut. For example, the circumferential securing material 2 may be placed around the outer facing side of the frame 1, wherein the length of the securing material 2 runs around the entire circumference of the frame 1 and the width of the securing material 2 is sized to hang over each side of the frame 1 and overlap (e.g., about 1 inch) on each side with the front material 3 and the rear material 4. The securing fabric 2 is then secured to the front material 3 and rear material 4 (e.g., stitched through both sides of the securing material 2 and through the front material 3 and rear material 4) around the entire circumferential (or perimeter) length of the frame 1, in order to secure the securing material 2 to the frame 1 (and with the stitching within the frame 1). In accordance with aspects of the disclosure, this ensures that the front material 3 and rear material 4 are pulled taut and are flat when the frame 1 is open.

Additionally, as shown in FIG. 1, a hoop- (or loop-) shaped hanging attachment 13 is connected (e.g., stitched) to the frame 1 at a top of the frame 1 (e.g., stitched within the circumferential material 2). In embodiments, the hanging attachment 13 may be a piece of fabric. In other contemplated embodiments, the hanging attachment 13 may be a molded plastic, or other suitable material, for example.

As noted above, as shown in FIG. 1, embodiments of the disclosure utilize a strap arrangement 110 (for example, on each side of the screen 100) that includes a vertical strap 7 and an X-shaped strap 5 (e.g., two straps arranged in an "X" shape or a single strap having an "X" shape) 5 that provides additional stability for the screen 100 to keep the screen 100 from tilting backwards. In embodiments, each of the straps may be a non-elastic strap (e.g., webbing material). In accordance with additional aspects of the disclosure, the "X"-shaped strap 5 also allows for secure mounting on irregular shaped chair backs. While not shown in FIG. 1, it should be understood that with embodiments of the present disclosure, the other side of the screen 100 also includes a screen material 3 and a strap arrangement 110 for reversible mounting of the screen.

In embodiments, the two "X" shaped pieces of material may be cut and the four ends of each of the "X" shaped pieces attached to respective sides of the screen 100 to form the "X"-shaped straps 5. The "X"-shaped straps 5 (one shown) are used as securing straps in order to slide the screen 100 over the back of a chair (not shown). While the four ends of X-shaped strap 5 are attached to screen (in an adjustable manner, as described further below), the medial portions of the X-shaped strap 5 are separated from front material 3 with a gap (which is adjustable, as described further below) large enough to slide the back of a chair between the X shaped strap 5 and its respective front material 3.

As shown in FIG. 1, the screen 100 may also include a pocket 11 formed at the bottom of the screen. For example, an additional piece of material attached (e.g., sewn) to the screen material 3 below the X-shaped strap 5 to create a pocket 11 (on each side of the screen 100). With an exemplary embodiment, the side edges of the material for the pocket 11 are stitched, while the upper edge is left unstitched to create the pocket 11. In some embodiments, the material of the pocket 11 may extend downwardly to the outer edge of the screen 100 be secured on its bottom edge inside the circumferential securing material 2 along with front screen material 3 and the back screen material (not shown).

Figure 2:
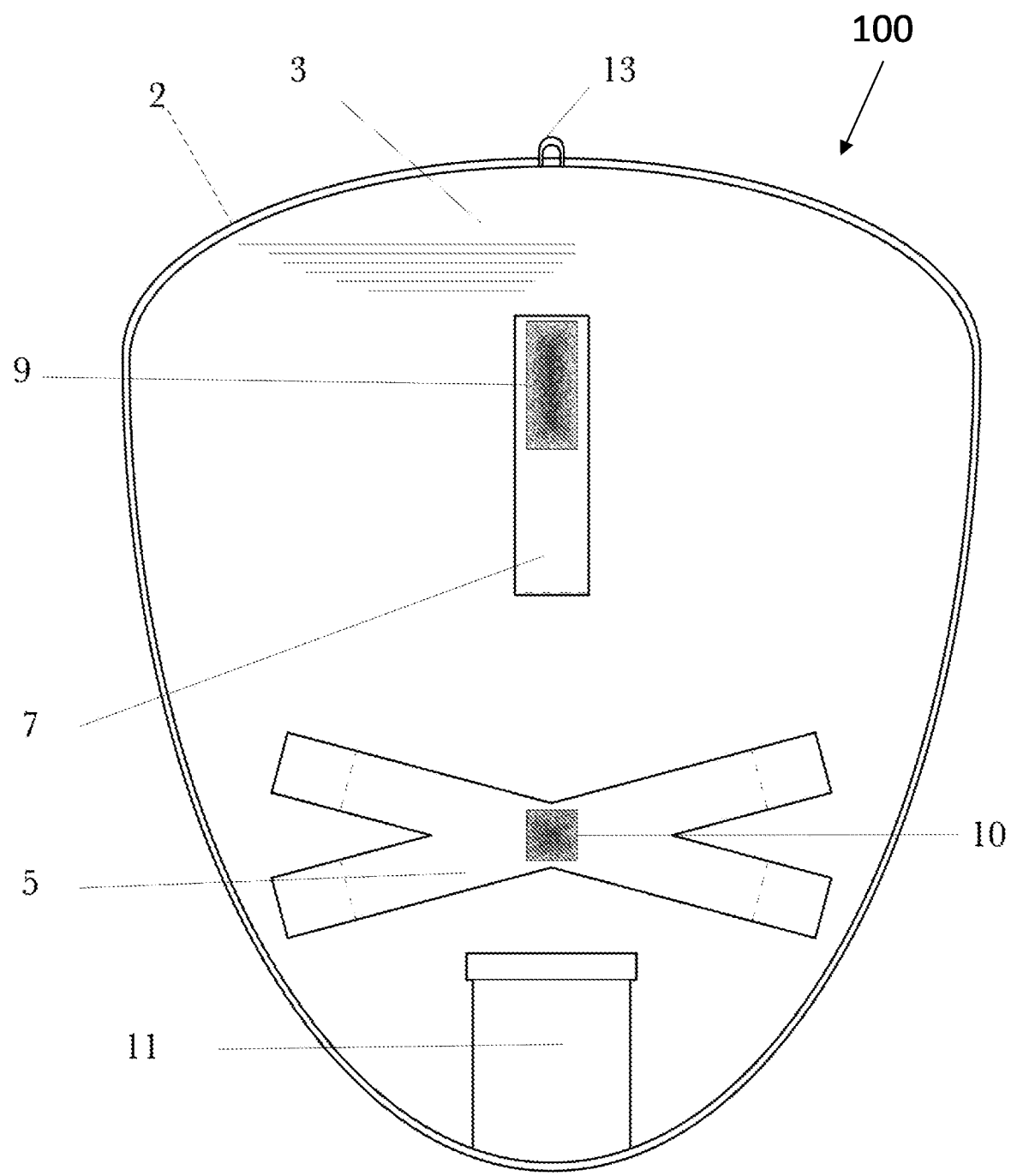
FIG. 2 shows the exemplary chair-mounted screen in "open" position in accordance with aspects of the disclosure.

FIG. 2 shows the exemplary chair-mounted screen in an "open" position in accordance with aspects of the disclosure. When in the "open" position, the inner side of the vertical strap 7 is viewable. In embodiments, the vertical strap 7 is approximately perpendicular to the orientation of the X-shaped strap 5 and is secured (e.g., stitched) to the screen material 3 at a topmost edge of the vertical strap. The length of the vertical strap 7 is such that it extends past the center cross section of the X on the X-shaped strap 5.

As shown in FIG. 2, the inner side of the vertical strap 7 includes a vertical patch 9 of hook and loop material secured (e.g., stitched and/or adhered) thereto. As shown in FIG. 2, the vertical patch 9 extends along a length of the vertical strap, which allows the attachment region between the vertical strap 7 and the X"-shaped strap 5 to be adjustable for different sizes and shapes of chair backs. For example, in embodiments, the vertical patch 9 is long enough to cover at least half the length of vertical strap 7.

Additionally, as shown in FIG. 2, an outer surface of the X-shaped strap 5 (e.g., at the center of the X) includes a horizontal patch 10 of corresponding material and in a corresponding arrangement with the vertical patch 9 on the vertical strap 7. For example, horizontal patch 10 may be sewn on the outer-facing surface of the center of the X-shaped strap 5. In accordance with aspects of the disclosure, the vertical patch 9 and the horizontal patch 10 are lined up over one another and can fasten together. When in the "closed" position of FIG. 1, the vertical patch 9 is fastened to the horizontal patch 10 via the hook and loop fastener, which allows the vertical strap 7 to lay over the top of the back of the chair and, depending on the girth of the back of the back of the chair, fasten to the center of X-shaped strap 5 at the appropriate point. In such a manner, the vertical strap 7 can be adjusted depending on the size, shape, and/or girth of the chair.

Figure 3:
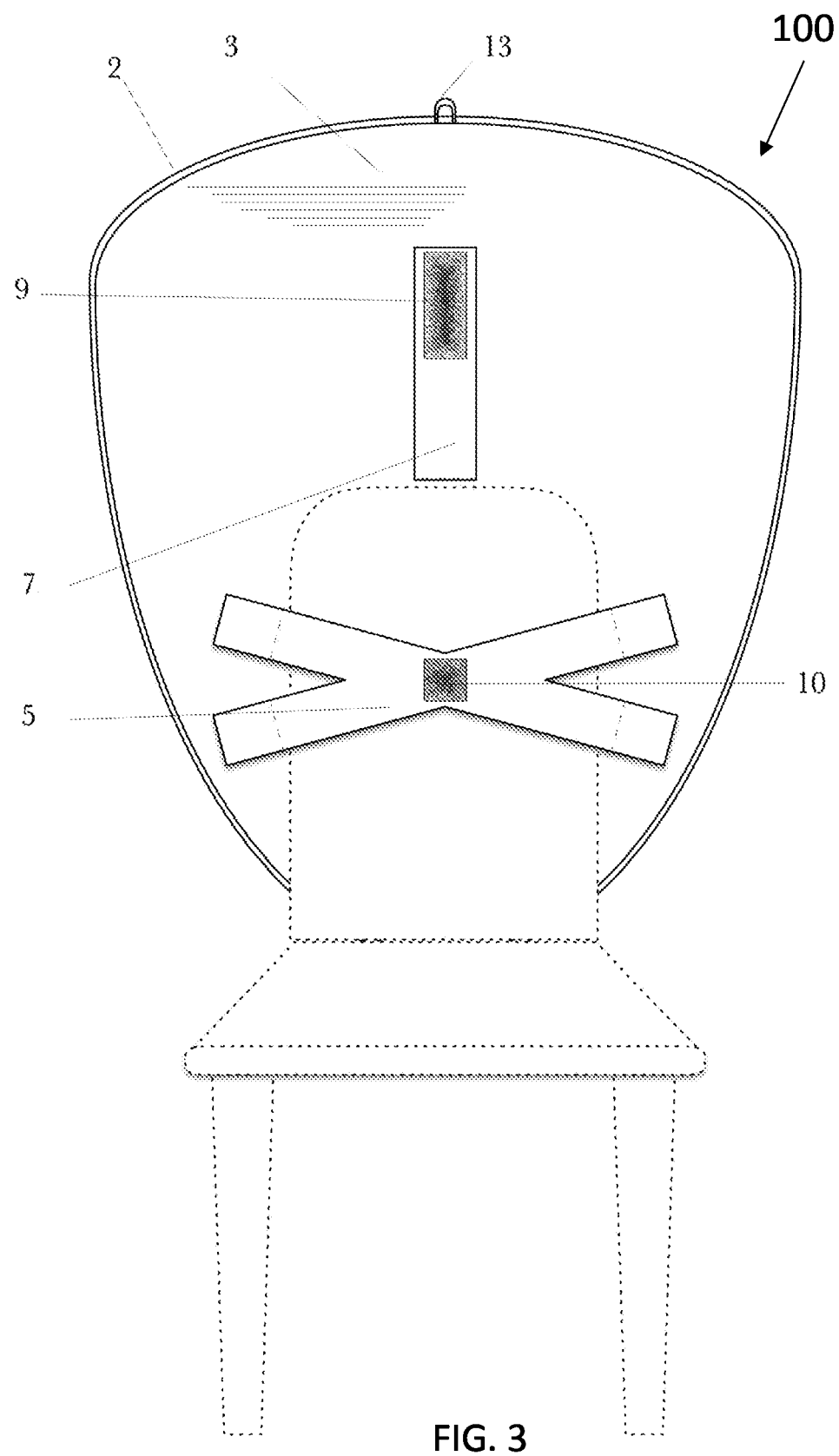
FIG. 3 shows the exemplary chair-mounted screen "open" position and arranged on a chair in accordance with aspects of the disclosure.

FIG. 3 shows the exemplary chair-mounted screen 100 in an "open" position and arranged on a chair 300 in accordance with aspects of the disclosure. As shown in FIG. 3, while the four ends of X-shaped strap 5 are attached to the screen 100 (in an adjustable manner, as described further below), the medial portions of the X-shaped strap 5 are separated from the front material 3 with a gap (which is adjustable, as described further below) large enough to slide the back 310 of a chair 300 between the X-shaped strap 5 and the front material 3. When in the "open" position, the vertical strap 7 is not attached to the X-shaped strap 5, which allows the screen 100 to be easily arranged on the seat back 310 and adjusted to the desired height. Once the screen 100 is arranged on the seat back 310 via the X-shaped strap 5, the vertical strap 7 is lowered to bring the vertical patch 9 into fastening contact with the horizontal patch 10.

Figure 4:
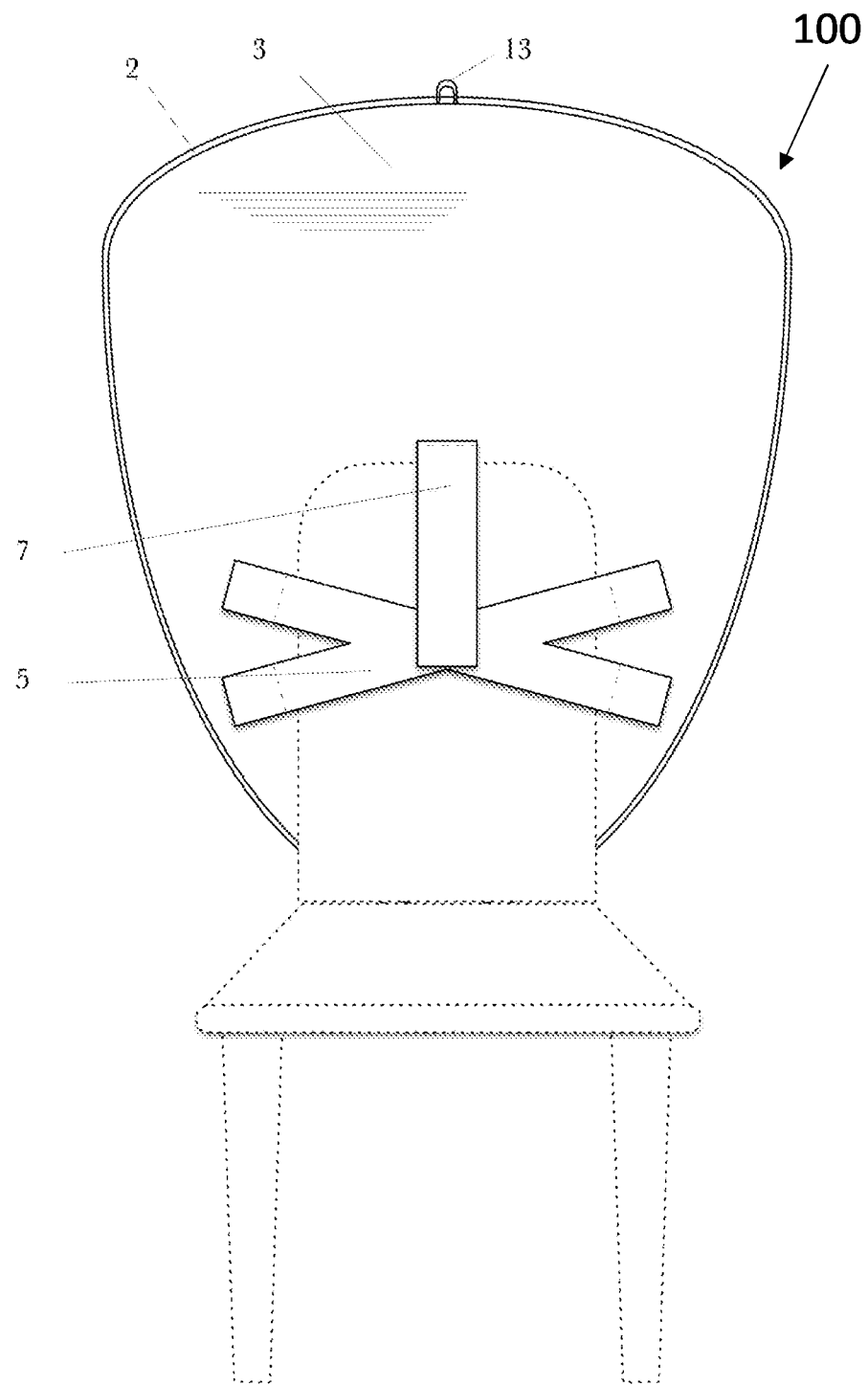
FIG. 4 shows the exemplary chair-mounted screen in a "closed" position and arranged on a chair in accordance with aspects of the disclosure.

FIG. 4 shows the exemplary chair-mounted screen 100 in a "closed" position and arranged on a chair 300 in accordance with aspects of the disclosure. Once the screen 100 is arranged on the seat back 310 via the X-shaped strap 5, and the vertical strap 7 is lowered to bring the vertical patch 9 into fastening contact with the horizontal patch 10, the vertical strap is fastened to the X-shaped strap 5. In accordance with aspects of the disclosure, the vertical strap 7 (once fastened to the X-shaped strap 5) engages with the top of the seat back, and thus prevents the screen 100 from moving downwardly. In such a manner, the vertical strap 7 contributes to maintaining the screen 100 in the desired orientation and position.

In embodiments, the vertical strap 7, which is attachable to the X-shaped strap 5 via hook-and-loop patches, may also include an additional hook-and-loop patch (not shown) at the very top portion of the strap (similar to the strap free-length adjustment arrangement of X-shaped strap, discussed below). This patch enables the screen 100 to have sufficient range of vertical adjustment to work with all kinds of chairs (including those chairs with headrests) and still provide stability to the screen to maintain it upright. Depending on a user's height and the height of the chair-back, the user may choose how high or low to slide the screen 100 on the seatback. If it is slid higher onto the chair-back it can cause the screen to want to tilt back. By keeping the hook-and-loop patch at the top portion of vertical strap 7 closed it effectively shortens the length of the vertical strap 7, thereby increasing tension in the vertical strap, which pulls harder to keep the screen upright. In a similar manner, if the screen 100 needs to be pulled lower down on the chair-back, pulling apart the hook-and-loop patch can add additional length allowing the screen 100 to be pulled down lower. Pulling apart the hook-and-loop patch also adds length to the vertical strap 7 making it easier for a user to pull the screen 7 over a headrest on a seatback (if the user chooses to do so).

Figure 5:
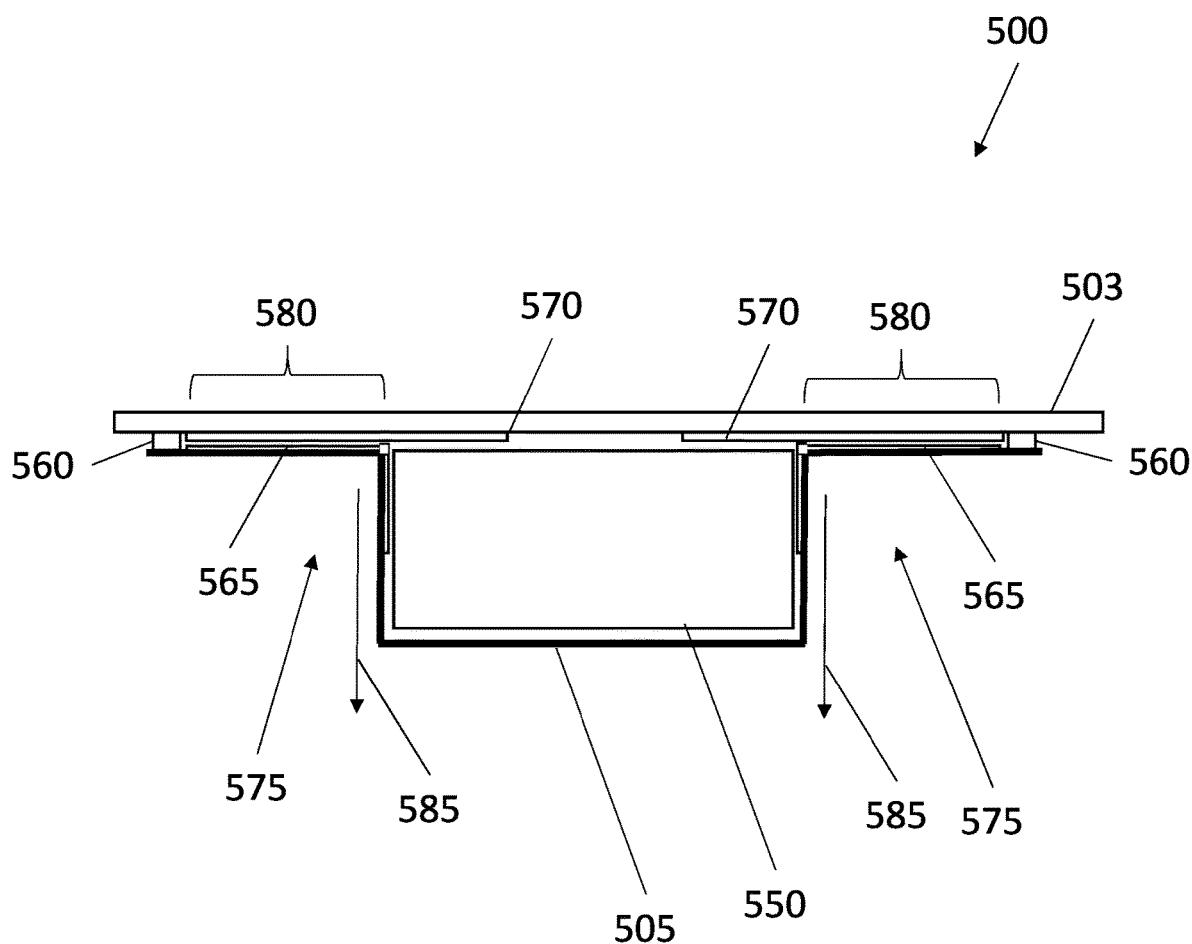
FIG. 5 shows a schematic sectional view depiction of a chair-mounted screen arranged a relatively larger chair in accordance with aspects of the disclosure.

FIG. 5 shows a schematic sectional view depiction of a chair-mounted screen 500 arranged on a relatively larger seatback 550 in accordance with aspects of the disclosure. As shown in FIG. 5, the screen 500 includes a screen material 503 and an X-shaped strap 505 (which is schematically depicted). With embodiments of the present disclosure, the X-shaped strap 505 may have fixed length. The X-shaped strap 505 is attached (e.g., stitched, adhesively-bonded, thermally-bonded, etc.) to the screen material 503 at fixed attachment points 560 proximately at the four ends of the X-shaped strap 505 (with only two end points shown in FIG. 5).

As noted above, in accordance with aspects of embodiments of the present disclosure, the straps are adjustable in a manner so that the screen may securely-mountable to a wide variety of chair types and sizes without warping the screen. For example, the X-shaped strap 505 includes a strap free-length adjustment arrangement 575, which allows a user to adjust an amount of available free-length of the strap, which is available to wrap around a chair (and adjust an amount of fixed length of the strap, which is fixed to the screen, and thus not available to wrap around a chair).

As shown in FIG. 5, the strap free-length adjustment arrangement 575 includes strap patches 565 of hook and loop fastening material arranged on an interior-facing surface of the X-shaped strap 505 and corresponding screen patches 570 of hook and loop fastening material arranged on an exterior-facing surface of the screen material 3. For example, four screen patches 570 of loop material are arranged to match up approximately opposite the four strap patches 565 of the X-shaped strap 505 and attached (e.g., sewn) to the outside facing plane (or exterior-facing surface) of the screen material 3 (in embodiments, on each side) of the screen 100. The X-shaped strap 505 is attached (e.g., stitched, adhesively bonded, thermally-bonded, etc.) to the screen material 503 at ends of each of the four "arms" of the X-shaped strap 505 at the fixed attachment points 560 proximately at the four ends (with only two end points shown in FIG. 5).

In accordance with aspects of the disclosure, when necessary (e.g., with a smaller chair), more of the X-shaped strap 505 may be fastened to the screen material 3 via the strap free-length adjustment arrangement 575 so that the screen may securely-mountable to a wide variety of chair types and sizes without warping the screen. As can be observed in FIG. 5, in accordance with aspects of the disclosure, the portion of the engagement of the strap free-length adjustment arrangement 575 that is engaged determines an anchor length 580 for each of the four ends of the X-shaped strap 505 on the sides of the seatback. This leaves the medial portions of the X-shaped strap 505 separated from the screen material 3 with a gap large enough to slide the back of a chair between the X-shaped strap 505 and the screen material 3.

In accordance with aspects of the disclosure, the X-shaped strap 5 is operable to perform two functions by virtue of its shape and design. First, the X-shaped strap 5 creates more structural support on the chair-back by splitting out into four arms and terminating at four attachment regions. The weight of the screen 100 is distributed over a larger surface area so the tendency of the screen's weight to cause the screen 100 to tilt backwards is greatly diminished by the increased tension provided by the surface area of four "arms" (as opposed to just having a straight horizontal strap). Second, on each arm of the X there is a hook-and-loop patch, which is operable to allow the strap to be adjustable for varying widths of seatbacks (and even irregularly shaped seatbacks). For example, with an exemplary and non-limiting embodiment, when all of the hook-and-loop patches are closed up the strap can fit over a chair-back that is up to 17.25" in width or narrower. But when all of the patches are pulled apart, the strap can go over a chair-back as wide as 30.25". Additionally, if a chair back is narrower at the top and widens as it gets lower down to the seat, the X-Strap can accommodate that by having the patches on the top arms of the X strap closed, and the patches on the bottom arms pulled apart as needed.

As shown in FIG. 5, with this exemplary embodiment, there remains an un-engaged portion of the strap free-length adjustment arrangement 575 on each side of the seatback 550 (i.e., those portions of the strap patches 565 and screen patches 570 that are not engaged with one another). Thus, in accordance with aspects of the disclosure, the extent of attachment of the X-shaped strap 505 (via both the fixed attachment points 560 and the strap free-length adjustment arrangement 575) can range from: only attachment via the fixed attachment points 560 (e.g., for an extremely large seatback cross-section) to attachment via the fixed attachment points 560 and the complete range of the strap free-length adjustment arrangement 575 (e.g., for an extremely small seatback cross-section).

By implementing these aspects of the disclosure, a user can attain a secure attachment of the screen to the chair without having to rely on elastic material that can warp the shape of the screen. Moreover, by providing the ability to anchor the X-shaped strap 505 as close as possible to the body of the chair, the force (depicted by arrow 585) pulling on the screen is approximately orthogonal to the screen, such that the amount of pull on the screen that could induce a warp on the screen is reduced (for example, as compared to a screen with only strap anchor points of a fixed length and at a fixed location). By implementing this aspect of the disclosure, a user may adjust the straps of the screen in a quick and effective manner, for example, when arranging the screen on a particular chair, so that the screen can securely mount to the chair. This also allows for easily moving the screen between chairs having different-sized seatbacks.

Figure 6:
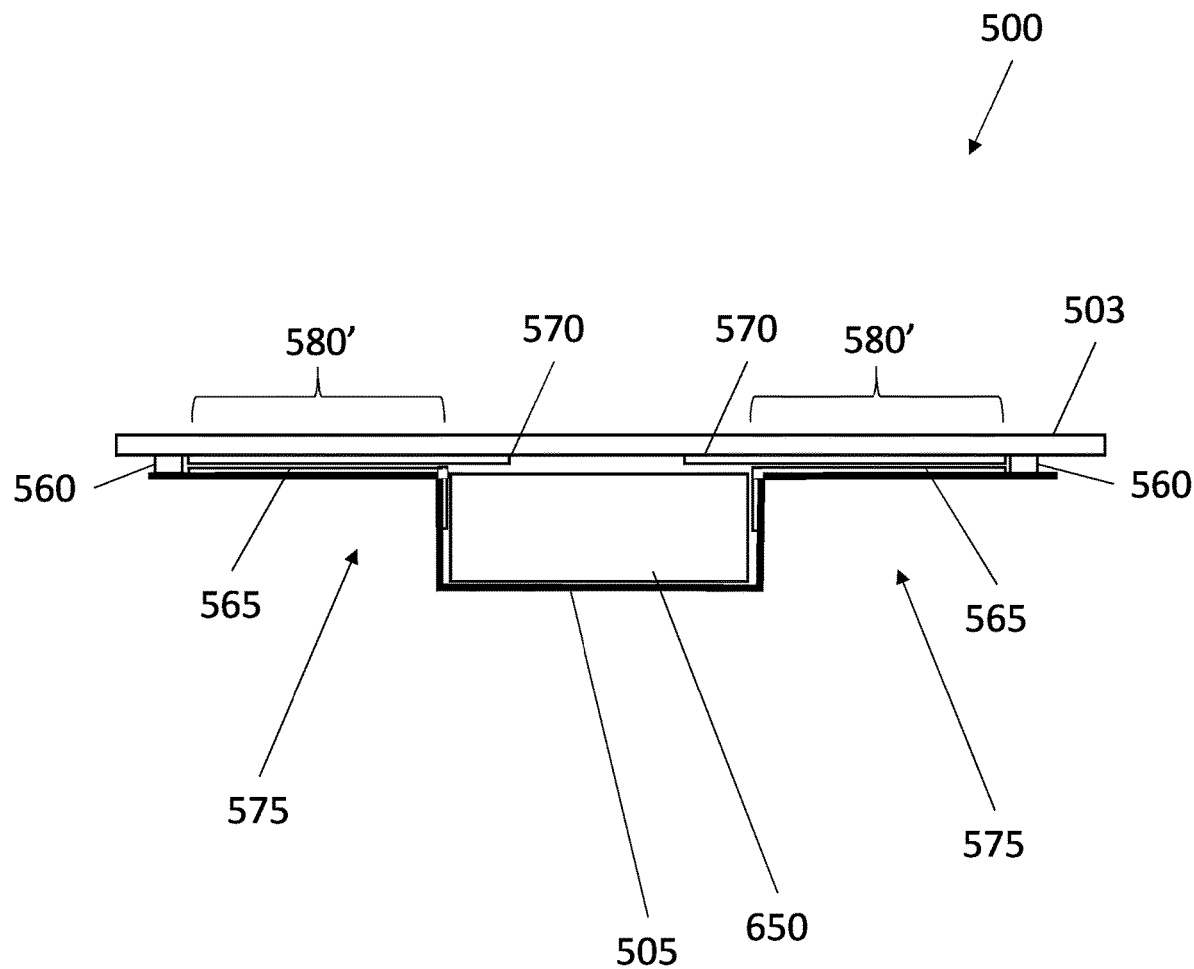
FIG. 6 shows a schematic sectional view depiction of the chair-mounted screen arranged on a relatively medium-sized chair in accordance with aspects of the disclosure.

FIG. 6 shows a schematic sectional view depiction of the chair-mounted screen 500 arranged on a relatively medium-sized chair seatback 650 in accordance with aspects of the disclosure. As can be observed in comparing FIG. 6 with the example of FIG. 5, with the relatively medium-sized chair seatback 650, a smaller gap between the X-shaped strap 505 and the screen material 503 is needed to accommodate the smaller seatback. Thus, as shown in FIG. 6, the strap free-length adjustment arrangement 575 is further engaged (which increases the anchor length 580').

In contrast, should, for example, the back of the chair be too wide to fit in the unfastened medial section of the X-shaped strap 505, the engaged portions of the strap patches 565 and screen patches 570 can be pulled apart from the medial section to allow for the additional size of the back of the chair to pass through the medial section.

Figure 7:
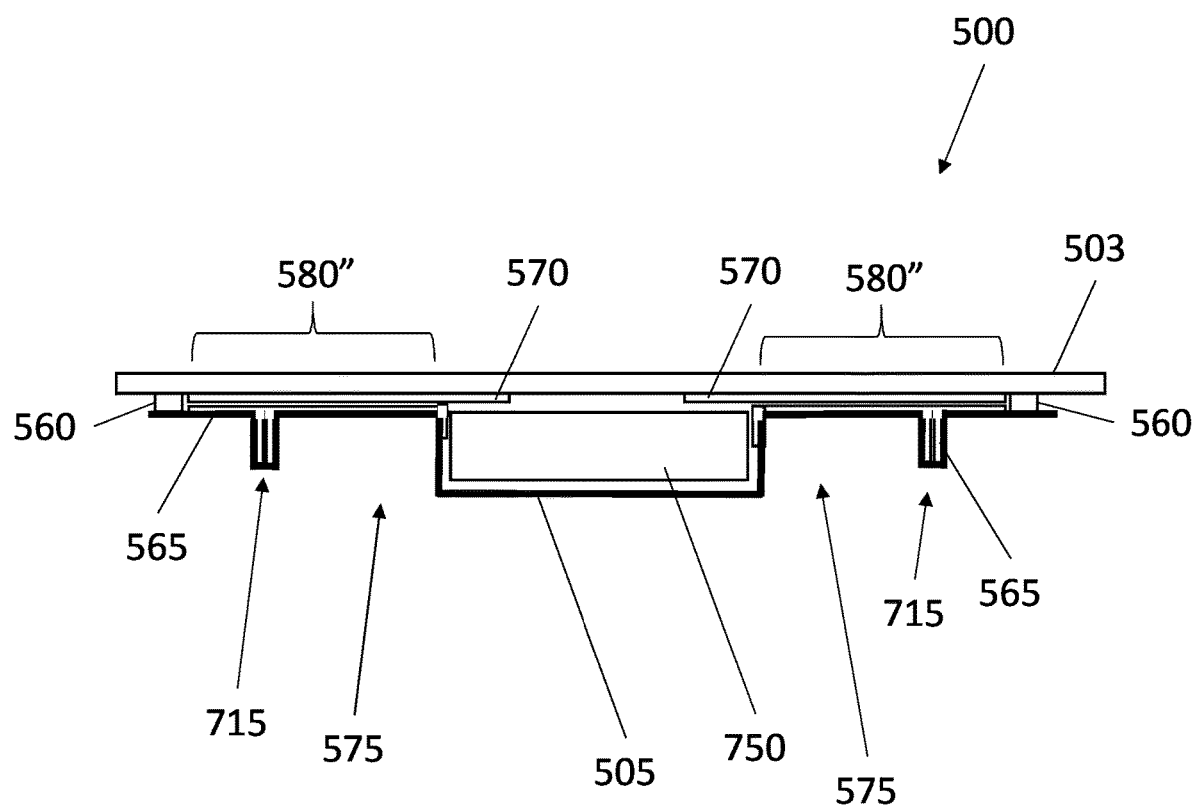
FIG. 7 shows a schematic sectional view depiction of a chair-mounted screen arranged on a relatively smaller chair in accordance with aspects of the disclosure.

FIG. 7 shows a schematic sectional view depiction of a chair-mounted screen 500 arranged on a relatively smaller chair seatback 750 in accordance with aspects of the disclosure. As can be observed in comparing FIG. 7 with the examples of FIGS. 5 and 6, with the relatively smaller chair seatback 750, a yet smaller gap between the X-shaped strap 505 and the screen material 503 is needed to accommodate the smaller seatback. Thus, as shown in FIG. 7, in accordance with aspects of the disclosure, with some seat configurations, the strap free-length adjustment arrangement 575 may be engaged in such a manner that a portion (or portions) of the X-shaped strap 505 is bundled 715 (or folded upon itself) along the anchor length 580'' to create a yet smaller gap between the X-shaped strap 505 and the screen material 503.

Figure 8:
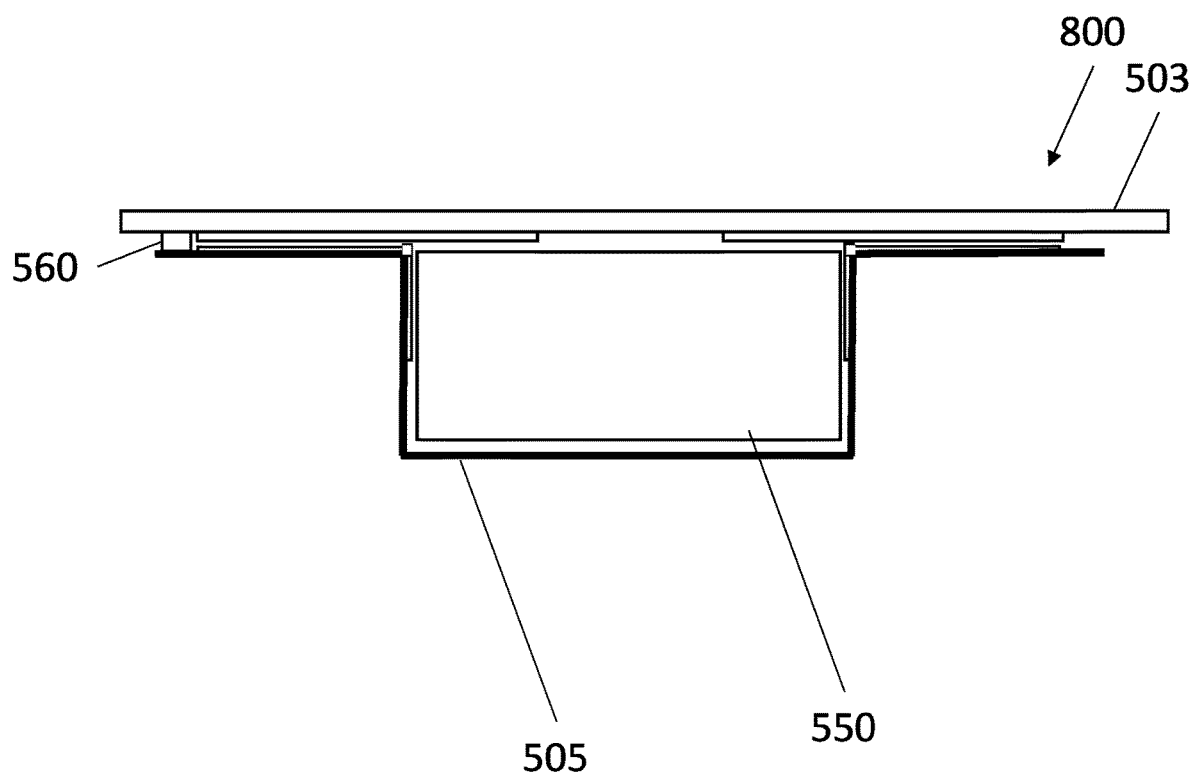
FIG. 8 shows a schematic sectional view depiction of a chair-mounted screen arranged on a relatively larger chair in accordance with additional aspects of the disclosure.

FIG. 8 shows a schematic sectional view depiction of a chair-mounted screen 800 arranged on a relatively larger chair in accordance with additional aspects of the disclosure. As shown in FIG. 8, with this exemplary embodiment, the X-shaped strap 505 is secured via fixed attachment points 560 to the screen material 3 only at two of the four ends of the X-shaped strap 505 (e.g. on one lateral side of the X-shaped strap 505). In accordance with additional aspects of the disclosure, with this exemplary embodiment, the X-shaped strap 505 can be fully detached from the screen material 503 one on side, which may allow the screen 800 to be mounted to a chair seatback 550 in an approximate sideways direction. This is in contrast to the approximate vertical mounting direction of those embodiments having fixed attachment points 560 on both lateral sides of the screen material 503. In such a manner, by implementing these aspects of the disclosure, a screen 800 can be easily mounted in areas with little vertical clearance.

While not shown in FIG. 8, with other contemplated embodiments, the X-shaped strap 505 may be secured via fixed attachment points 560 to the screen material 3 only at the two upper ends of the X-shaped strap 505 (e.g. on the upper side of the X-shaped strap 505). With this exemplary embodiment, when mounting the screen on a chair, the lower ends of the X-shaped strap 505 can be fully detached from the screen material 3 to allow the lower ends of the X-shaped strap 505 to pass through (or around) structural features (e.g., armrests) of the chair and re-attached to the screen material 3. In such a manner, by implementing these aspects of the disclosure, a screen 800 can be mounted for example on a chair with arm handles (that otherwise might preclude the screen from being properly mounted). Additionally, by passing the lower ends of the X-shaped strap 505 through (or around) structural features (e.g., armrests) of the chair and re-attached to the screen material 3, the screen 800 can more securely be attached to the chair.

Figure 9:
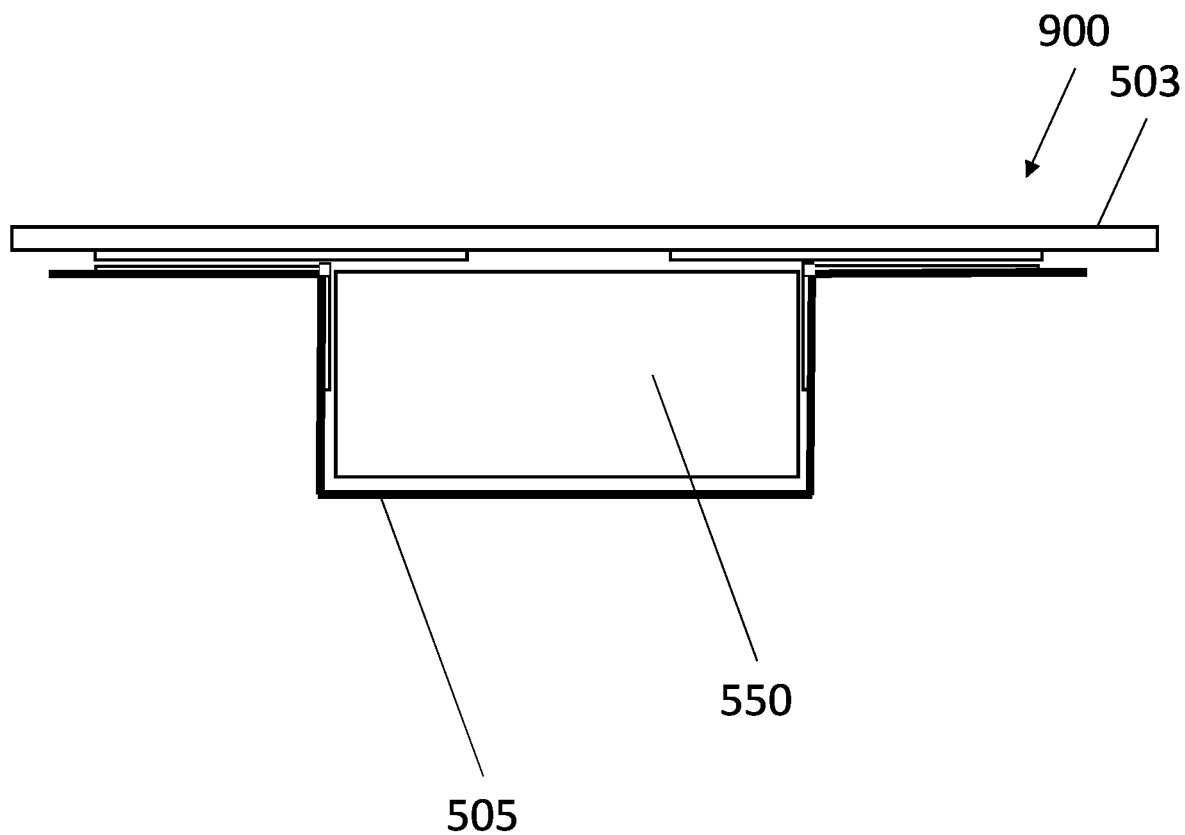
FIG. 9 shows a schematic sectional view depiction of a chair-mounted screen arranged on a relatively larger chair in accordance with additional aspects of the disclosure.

FIG. 9 shows a schematic sectional view depiction of a chair-mounted screen 900 arranged on a relatively larger chair in accordance with additional aspects of the disclosure. As shown in FIG. 9, with this exemplary embodiment, the X-shaped strap 505 is not secured via any fixed attachment points to the screen material 503. That is, with this exemplary embodiment, the X-shaped strap 505 is releasably-fastened to the screen material 503 only via the strap patches 565 and screen patches 570.

In accordance with additional aspects of the disclosure, with this exemplary embodiment, the X-shaped strap 505 can be fully detached from the screen material 503 on both sides, which may allow the screen 900 to be mounted to a chair seatback 550 in an approximate sideways direction and/or around structural features of the chair.

Figure 10:
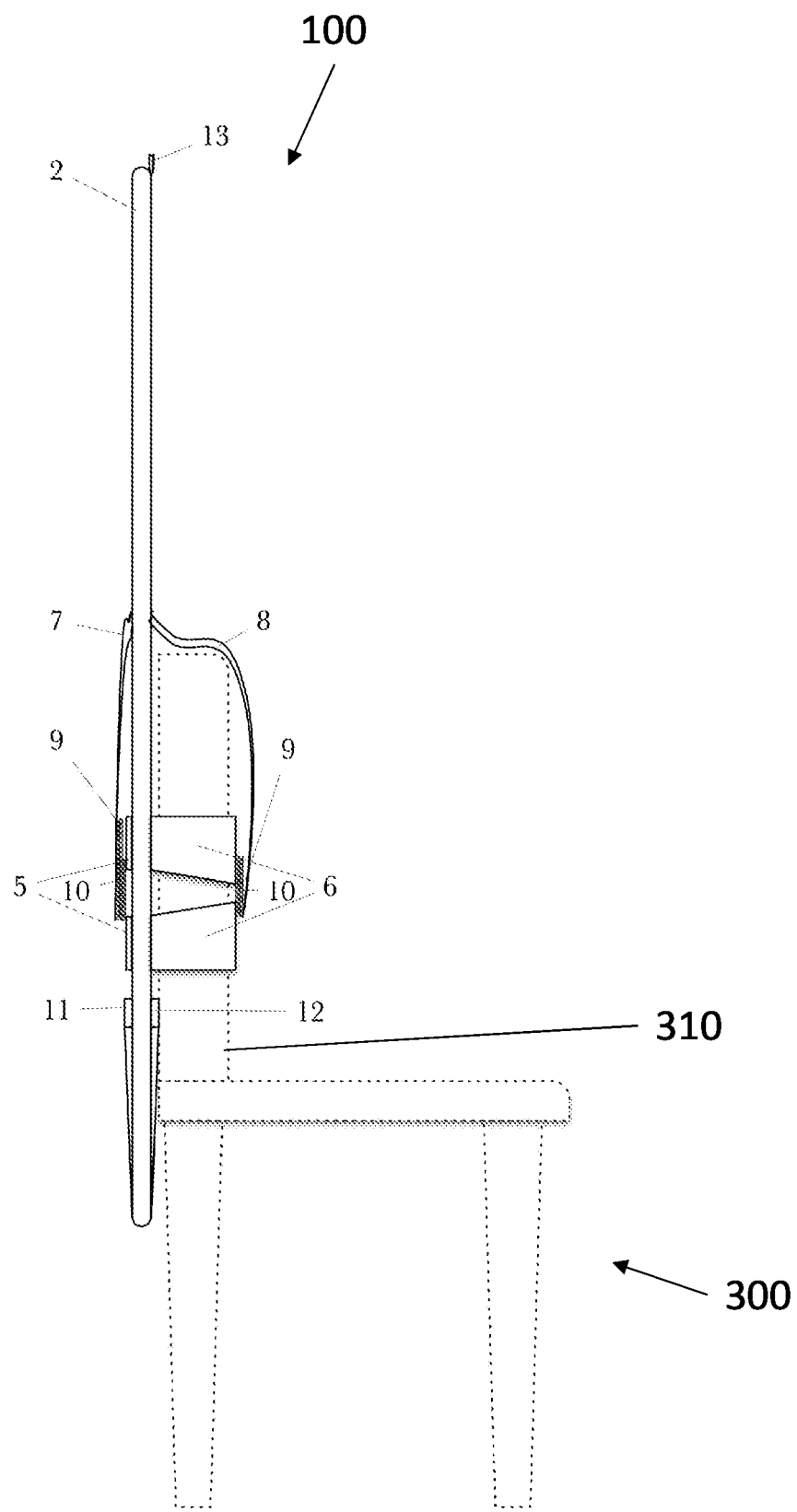
FIG. 10 shows a side view depiction of a chair-mounted screen arranged on a chair in accordance with additional aspects of the disclosure.

FIG. 10 shows a side view depiction of a chair-mounted screen 100 in a closed position arranged on a seat back 310 of a chair 300 in accordance with additional aspects of the disclosure. In contrast to the depiction of FIGS. 3 and 4, in which the front side of the screen (e.g., the front material 3) is shown, it should be understood that with the depiction of FIG. 10, the screen 100 is in a reversed orientation so that the rear side of the screen (e.g., the rear material 4 and the rear X-shaped strap 6) is facing the chair 300.

In accordance with additional aspects of the disclosure, the other side of the screen 100 also includes a screen material and a strap arrangement 110 for reversible mounting of the screen. For example, as shown in FIG. 10, the screen 100 includes a strap arrangement 110 on each side of the screen 100, each of which includes a vertical strap 7 (or 8) and an X-shaped strap 5 (or 6) that provides additional stability for the screen 100 to keep the screen 100 from tilting backwards. As shown in FIG. 10, the screen 100 may also include a pocket 11 (or 12) formed at the bottom of the screen on each side of the screen.

As shown in FIG. 10, the circumferential securing material 2 runs around the entire circumference (or perimeter) of the screen 100 and a hook- (or loop-) shaped hanging attachment 13 is arranged at the top of the screen 100.

As shown in FIG. 10, once the screen 100 is arranged on the seatback 310 via the X-shaped strap 6, and the vertical strap 8 is lowered to bring the vertical patch 9 into fastening contact with the horizontal patch 10, the vertical strap 8 is fastened to the X-shaped strap 6. In accordance with aspects of the disclosure, the vertical strap 8 (once fastened to the X-shaped strap 6) engages with the top of the seatback 310, and thus prevents the screen 100 from moving downwardly. In such a manner, the vertical strap 8 (or vertical strap 7, depending upon which side of the screen 100 is being utilized) contributes to maintaining the screen 100 in the desired orientation and position.

Additionally, as shown in FIG. 10, the four ends of X-shaped strap 6 are attached to the screen 100 (in an adjustable manner, as described above), while the medial portions of the X-shaped strap 6 are separated from rear material (not shown) of the screen 100 with a gap large enough to slide the seatback 310 of a chair 300 between the X-shaped strap 6 and the rear material.

In an exemplary operation, the bendable spring steel frame (see FIG. 15) is opened to its uncollapsed state thereby creating a flat screen with the two screen sides (e.g., materials) 3 and 4 secured to the bendable spring steel frame via the circumferential securing fabric 2 and pulled taut. Each of the screen sides 3 and 4 can be identical or different both in material and/or color in order to give users an option of which side to have facing their camera. X-shaped straps 5 and 6 are provided on each outward facing plane of the screen sides 3 and 4 are oriented vertically. As explained herein, in embodiments the X-shaped straps 5 and 6 are only stitched and secured to side materials 3 and 4 at the most distal ends of each arm. The x-shaped straps 5 and 6 include hook and loop patches stitched along each arm of the x-shaped straps facing corresponding hook and loop patches attached to the screen sides 3 and 4.

In accordance with aspects of the disclosure, this strap arrangement creates a gap between the screen sides 3 and 4 and the respective x-shaped straps 5 and 6 with an accommodation size (e.g., width and/or depth) that is adjustable and fixable via selective engagement of the hook and loop patches arranged between the x-shaped straps 5 and 6 and the screen sides 3 and 4, respectively (see, e.g., FIGS. 5-7)

For example, the hook and loop patches arranged between the x-shaped straps 5 and 6 and the screen sides 3 and 4 may be completely fastened to each other (e.g., along their longitudinal length), providing a gap with a small accommodation size. In the event that the chair back is wider than the gap formed by current arrangement of the x-shaped strap, however, in accordance with aspects of the disclosure, the gap can be selectively widened by pulling apart the hook and loop patches to the extent necessary to increase the accommodation size, e.g., to allow a wider chair back to slide between the x-shaped strap and the screen side. In embodiments, the greatest accommodation size of the gap may be provided by extending the gap to the very distal end of each arm of the X (e.g., at the stitching location) by completely pulling apart the hook and loop patches. This gap allows the screen in its entirety to slide over the back of a chair by sliding the chair back through the gap between screen side 3 or 4 and its respectively attached x-shaped strap 5 or 6. In contrast to support provided by a single horizontal strap, with embodiments of the present disclosure, the x-shaped straps 5 and 6 have arms that extend diagonally upwards and downwards on the chair back, creating more surface area contact between the strap and the chair back and providing the screen more stability to keep the screen in an upright and vertical position.

In accordance with additional aspects of the disclosure, the x-shaped straps provide further advantages, for example, if a chair back is irregular in shape. For example, each one of the four arms of the respective x-shaped straps 5 and 6 can be individually adjusted to a desired anchor length by pulling apart (unfastening) or connecting (fastening) the hook and loop patches.

Once the screen has slid onto the chair seatback, the screen can further be stabilized by pulling the adjustable vertical strap 7 or 8 down over the top of the seatback and fastened to the outside facing plane of the x-shaped strap 5 or 6 via hook and loop patches. By having the vertical patch 9 that is sewn to the inward facing plane of each of the vertical straps 7 and 8 extend up at least half the length of the strap, the strap 7 or 8 can be pulled down as much or as little as necessary to pull on the screen and further stabilize the screen and orient it vertically.

Once mounted on the chair back and oriented vertically, the screen can now act as a visual barrier behind the user sitting in the chair, thereby blocking the view behind the chair from view of a camera that is facing the user. The user can choose to use either side of the device to face the camera.

In the event that the screen needs further orienting into a vertical position, an item of a selectable thickness (e.g., a book) can be inserted into the pocket 11 or 12, thereby pushing the bottom edge of the screen further away from the base of the seat. In accordance with aspects of the disclosure, this in turn, tilts the top edge of the screen forward helping to orient the screen in a vertical position.

In the event that a user wants to hang the screen (e.g., not mount it on a chair), the small hoop 13 at the top of the screen allows the screen to be suspended from a hook or other suspension system (e.g., on a ceiling).

Figure 11:
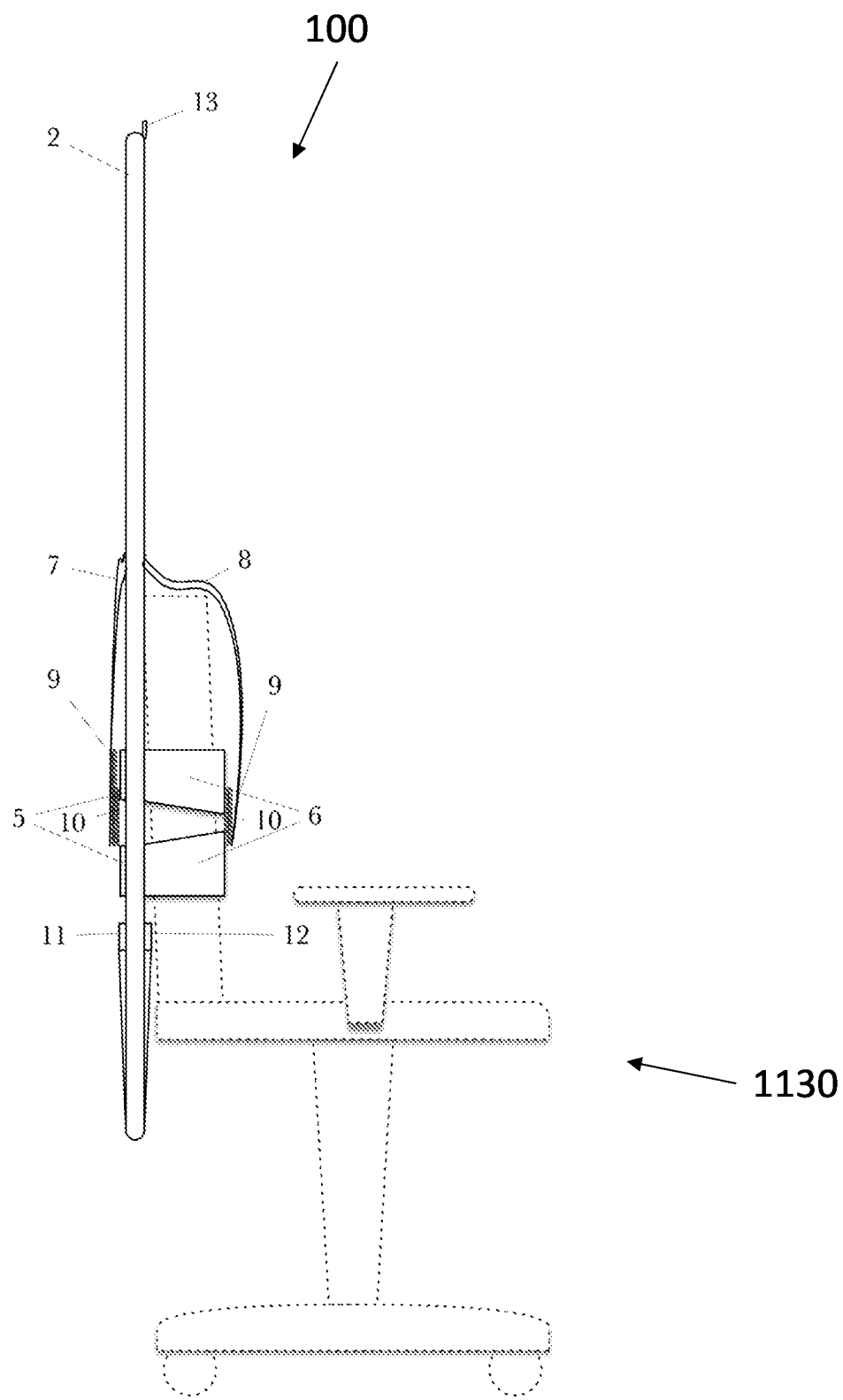
FIG. 11 shows a side view depiction of a chair-mounted screen arranged in a tipped orientation on a chair in accordance with additional aspects of the disclosure.

FIG. 11 shows a side view depiction of a chair-mounted screen arranged in a tipped orientation on a chair 1130 in accordance with additional aspects of the disclosure. Is some situations (e.g., depending upon the room conditions and/or the angle of a camera and the angled orientation of the seatback to the base of the chair), it may be advantageous to tilt (or tip) the upper end of the screen 100 forwardly to attain a vertical orientation (or to move from a vertical orientation, e.g., towards a front side of the chair 1130). For example, in the event that the screen 100 is tilting backwards (which can still occur despite the preventative measures designed in the strap system, e.g., if the chair back itself is angled backwards), the pocket serves the function of being a location where the user can insert a thick item (such as a book or a small box) that then serves to push against the seat portion of the chair. By pushing the bottom of a tilting screen 100 backwards, the top of the screen 100 then moves forward, thereby reducing the tilt and straightening the screen 100.

Thus, in embodiments, in the event that the screen 100 is tilting backwards, the vertical strap 8 (or 7) can be adjusted (e.g., re-attached in a manner that reduces the free length of the vertical strap) to induce a tilt in the screen 100. In the event that the screen needs further orienting, for example to attain a vertical position, an item of a certain thickness (e.g., a book) can be inserted into the pocket 12 (or 11) thereby pushing the bottom edge of the screen further away from the base of the chair, which in turn tilts (or tips) the top edge of the screen 100 forward helping to orient the screen in a desired vertical or forwardly-tipped position.

Figure 12:
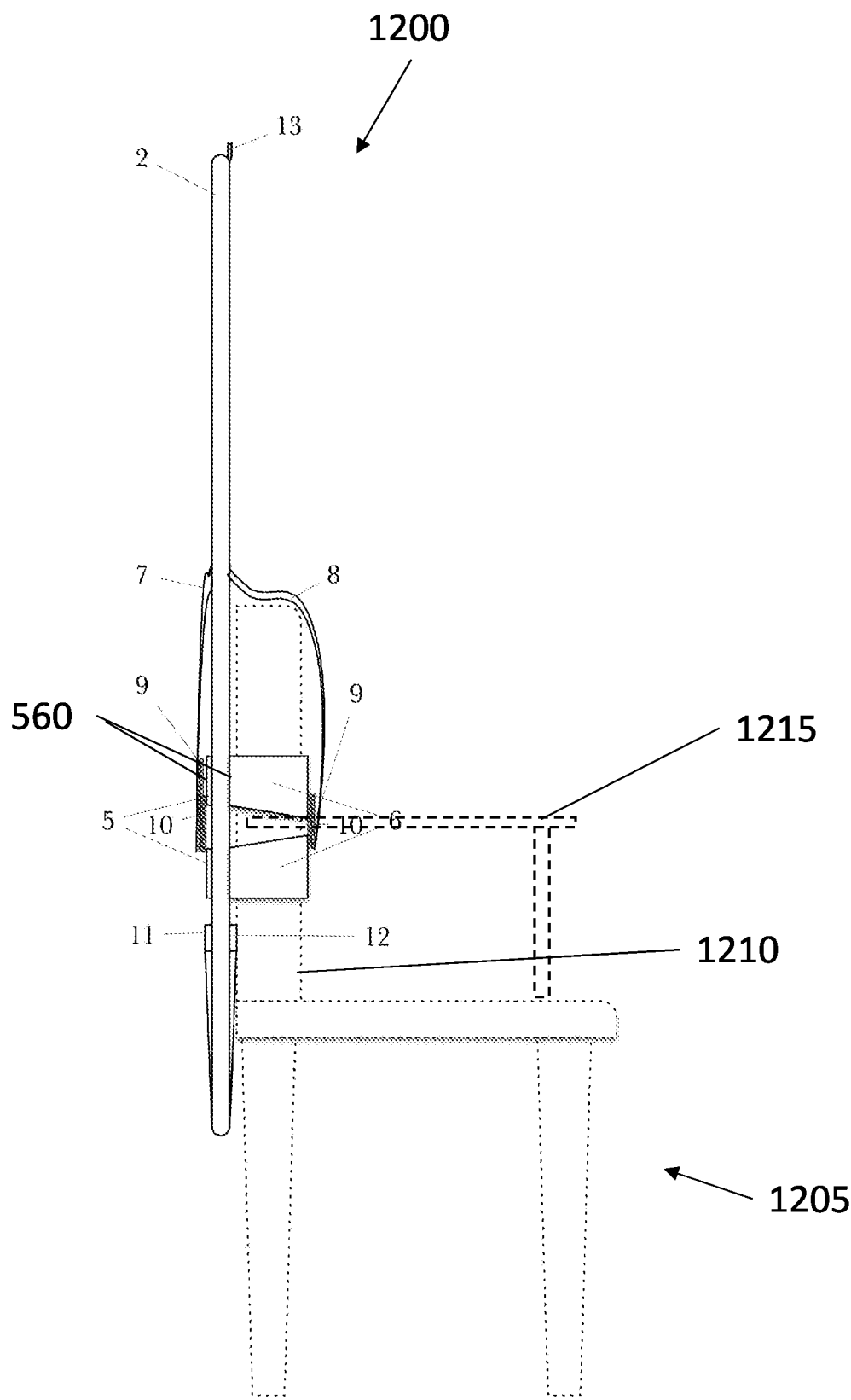
FIG. 12 shows a side view depiction of a chair-mounted screen in a closed position arranged on a seat back of a chair with arm rests in accordance with additional aspects of the disclosure.

FIG. 12 shows a side view depiction of a chair-mounted screen 1200 in a closed position arranged on a seatback 1210 of a chair 1205 with arm rests 1215 in accordance with additional aspects of the disclosure. As shown in FIG. 12, the chair 1205 includes arm rests 1215 that extend into the seatback 1210. As the arm rests 1215 extend into the seatback 1210, the arm rests 1215 might preclude a screen having X-shaped strap fixedly secured at all four ends of the X-shaped strap to the screen material.

Thus, with the embodiment of FIG. 12, the X-shaped strap 505 may be secured via fixed attachment points 560 to the screen material 3 only at the two upper ends of the X-shaped straps 5 and 6 on the upper sides of the respective X-shaped straps 5 and 6. With this exemplary embodiment, when mounting the screen on a chair, the lower ends of the X-shaped strap 6 can be fully detached from the screen material (not shown) to allow the lower ends of the X-shaped strap 6 to pass through (or around) structural features (e.g., the armrests 1215) of the chair 1205 and be re-attached to the screen material. In such a manner, by implementing these aspects of the disclosure, a screen 1200 can be mounted for e ample on a chair 1205 with arm rests 1215 (that otherwise might preclude the screen from being properly mounted). Additionally, by passing the lower ends of the X-shaped strap 6 through (or around) structural features (e.g., armrest(s) of the chair and re-attached to the screen material, the screen 1200 can be more securely attached to the chair and further prevent relative movement of the screen 1200 in a vertical direction.

Figure 13:
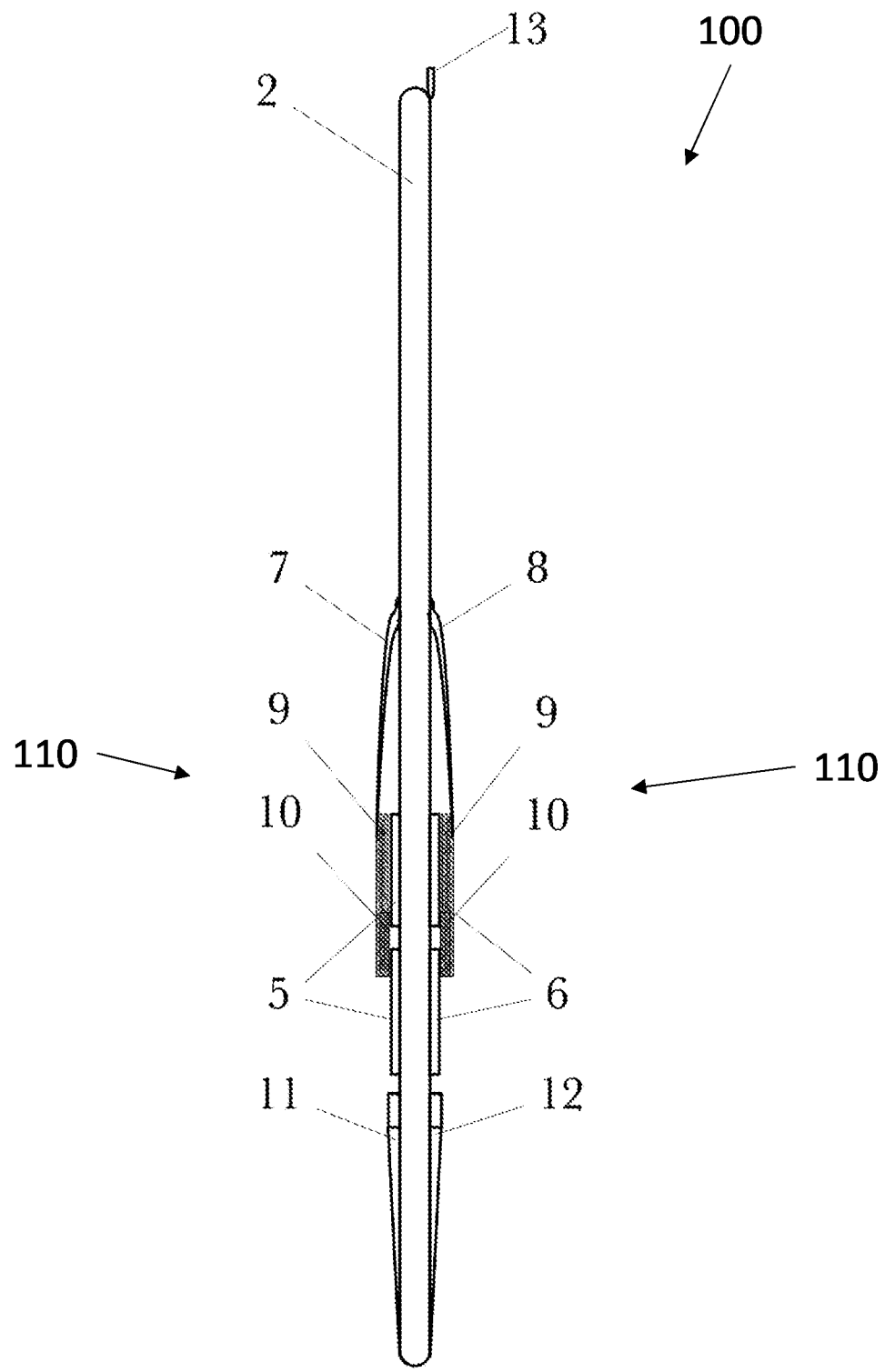
FIG. 13 shows a side view of an exemplary chair-mounted screen in an "closed" position in accordance with aspects of the disclosure.

FIG. 13 shows a side view of an exemplary chair-mounted screen 100 in a "closed" position in accordance with aspects of the disclosure. As shown in FIG. 13, the circumferential securing material 2 runs around the entire circumference (or perimeter) of the screen 100 and a hook- (or loop-) shaped hanging attachment 13 is arranged at the top of the screen 100. As shown in FIG. 13, the screen 100 includes a strap arrangement 110 on each side of the screen 100, each of which includes a vertical strap 7 or 8 and an X-shaped strap 5 or 6 that provides additional stability for the screen 100 to keep the screen 100 from tilting backwards. As shown in FIG. 13, the screen 100 may also include a pocket 11 or 12 formed at the bottom of the screen on each side of the screen.

Additionally, the inner side of the vertical straps 7 and 8 each include a vertical patch 9 of hook and loop material secured (e.g., stitched and/or adhered) thereto, and an outer surface of the X-shaped straps 5 and 6 each include a horizontal patch 10 of corresponding hook and loop material and in a corresponding arrangement with the vertical patches 9 on the vertical straps 7 and 8. When in the "closed" position of FIG. 13, the vertical patch 9 is fastened to the horizontal patch 10 via the hook and loop fastener.

Figure 14:
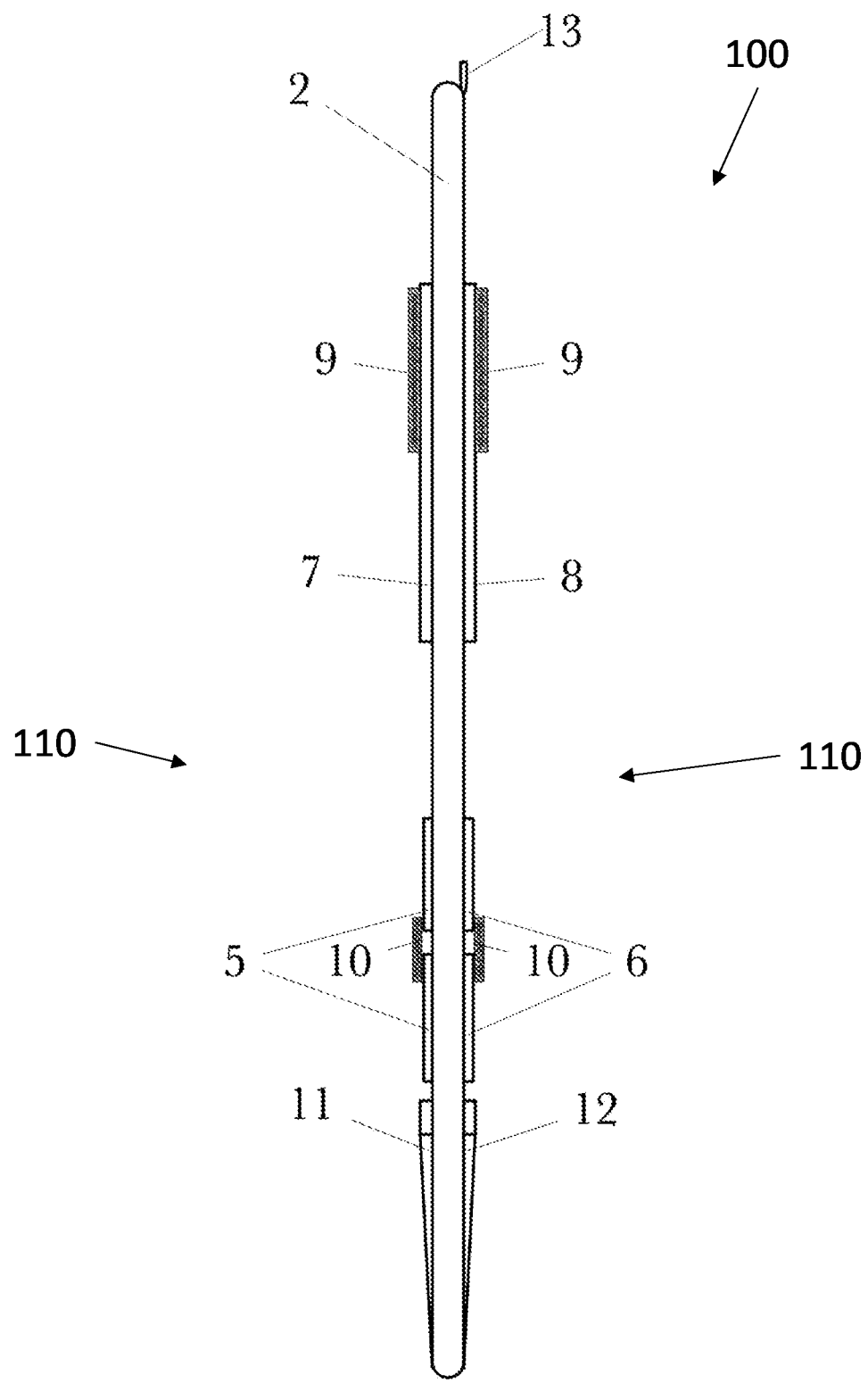
FIG. 14 shows a side view of an exemplary chair-mounted screen in an "open" position in accordance with aspects of the disclosure.

FIG. 14 shows a side view of an exemplary chair-mounted screen 100 in an "open" position in accordance with aspects of the disclosure. As shown in FIG. 14, the circumferential securing material 2 runs around the entire circumference (or perimeter) of the screen 100 and a hook- (or loop-) shaped hanging attachment 13 is arranged at the top of the screen 100. As shown in FIG. 14, the screen 100 includes a strap arrangement 110 on each side of the screen 100, each of which includes a vertical strap 7 or 8 and an X-shaped strap 5 or 6 that provides additional stability for the screen 100 to keep the screen 100 from tilting backwards. The screen 100 may also include a pocket 11 or 12 formed at the bottom of the screen on each side of the screen.

As shown in FIG. 14, the inner side of the vertical straps 7 and 8 each include a vertical patch 9 of hook and loop material secured (e.g., stitched and/or adhered) thereto, and an outer surface of the X-shaped straps 5 and 6 each include a horizontal patch 10 of corresponding hook and loop material and in a corresponding arrangement with the respective vertical patches 9 on the vertical straps 7 and 8.

When in the "open" position, the inner sides of the vertical straps 7 and 8 are exposed. In embodiments, the vertical straps 7 and 8 are approximately perpendicular to the orientation of the X-shaped straps 5 and 6, and are secured (e.g., stitched) to the screen materials at an upper edges of the respective vertical straps (which is the lower edge when the vertical straps are flipped upward to the "open" position). The length of the vertical straps 7 and 8 are such that they extend past the respective center cross section of the Xs on the X-shaped straps 5 and 6.

As shown in FIG. 14, the inner side of the vertical straps 7 and 8 each include a vertical patch 9 of hook and loop material secured (e.g., stitched and/or adhered) thereto. As shown in FIG. 14, the vertical patch 9 extends along a length of the vertical strap, which allows the attachment region between the vertical strap 7 and the X"-shaped strap 5 to be adjustable for different sizes and shapes of chair backs. For example, as shown in FIG. 14, in embodiments, the respective vertical patches 9 are long enough to cover at least half the length of vertical straps 7 and 8.

Figure 15:
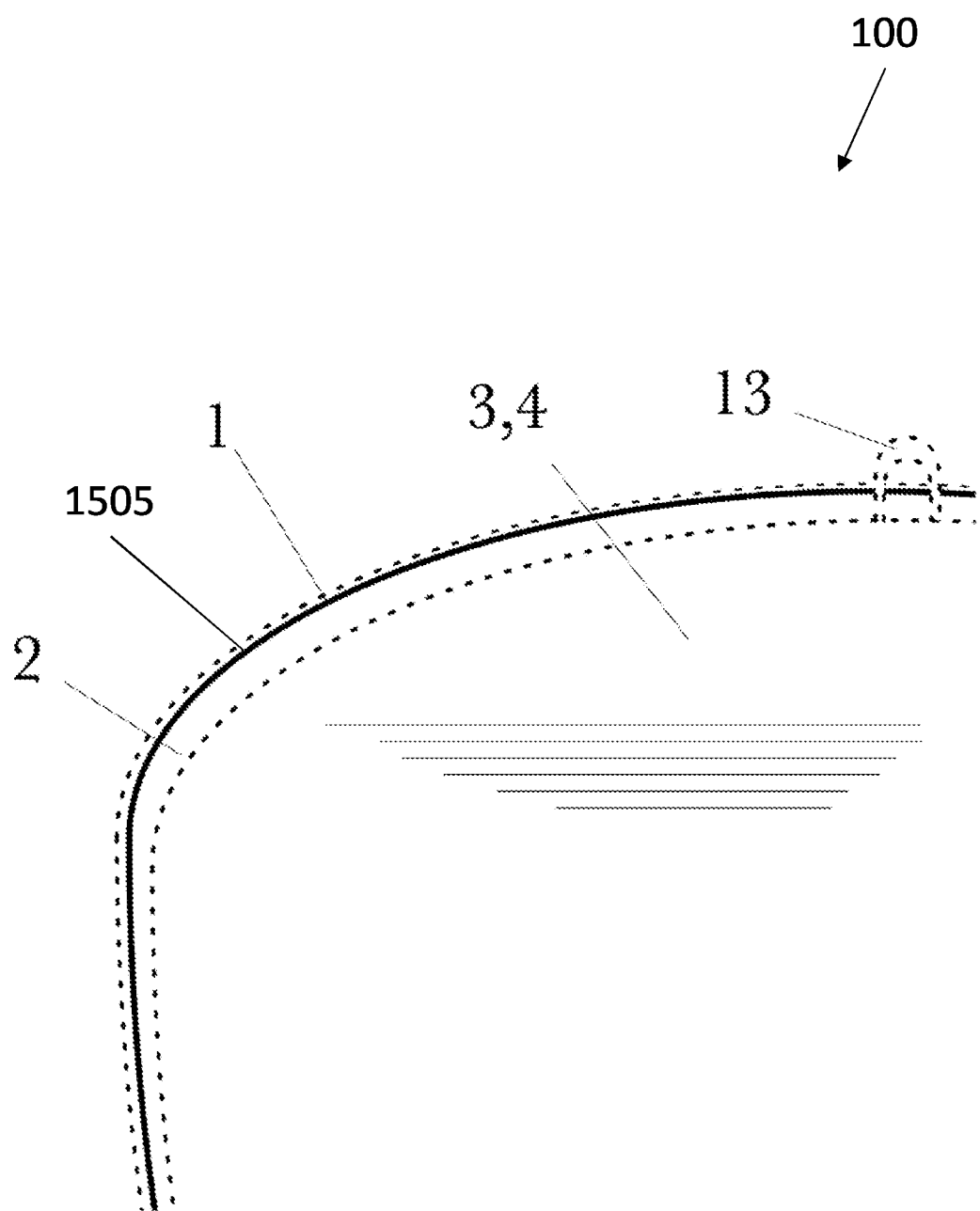
FIG. 15 shows a close-up view of a portion of an exemplary chair-mounted screen in accordance with additional aspects of the disclosure.

FIG. 15 shows a close-up view of a portion of an exemplary chair-mounted screen in accordance with additional aspects of the disclosure. As shown in FIG. 15, in embodiments, the screen may include a bendable material 1505 spring steel) may be bent into a shape to form a frame 1 of the chair-mounted screen 100. The screen 100 includes a "front" material 3 and a "rear" material 4 (which may be fabrics, and may be different from one another). As shown in FIG. 15, a securing material 2 (which may be a fabric) is arranged around the bendable material 1505 and fastened to form the frame 1 and to pull front material 3 and rear material 4 taut. The securing fabric 2 is secured to the front material 3 and rear material 4 (e.g., stitched through both sides of the securing material 2 and through the front material 3 and rear material 4) around the entire circumferential (or perimeter) length of the bendable material 1505, in order to secure the securing material 2 to the bendable material 1505 (and with the stitching within the frame 1). In accordance with aspects of the disclosure, this ensures that the front material 3 and rear material 4 are pulled taut and are flat when the frame 1 is open. Additionally, as shown in FIG. 15, a hoop- (or loop-) shaped hanging attachment 13 is connected (e.g., stitched) to the frame 1 at a top of the frame 1 (e.g., stitched within the circumferential material 2).

In accordance with further aspects of embodiments of the disclosure, the frame 1505 is made of bendable spring steel so that it can be twisted and collapsed to a smaller size. Thus, when not in use, the bendable spring steel frame 1505 can be twisted and folded in against itself thereby collapsing the screen 100 and giving it a smaller diameter, allowing the screen 100 to be placed in a bag for portability.

Figure 16:
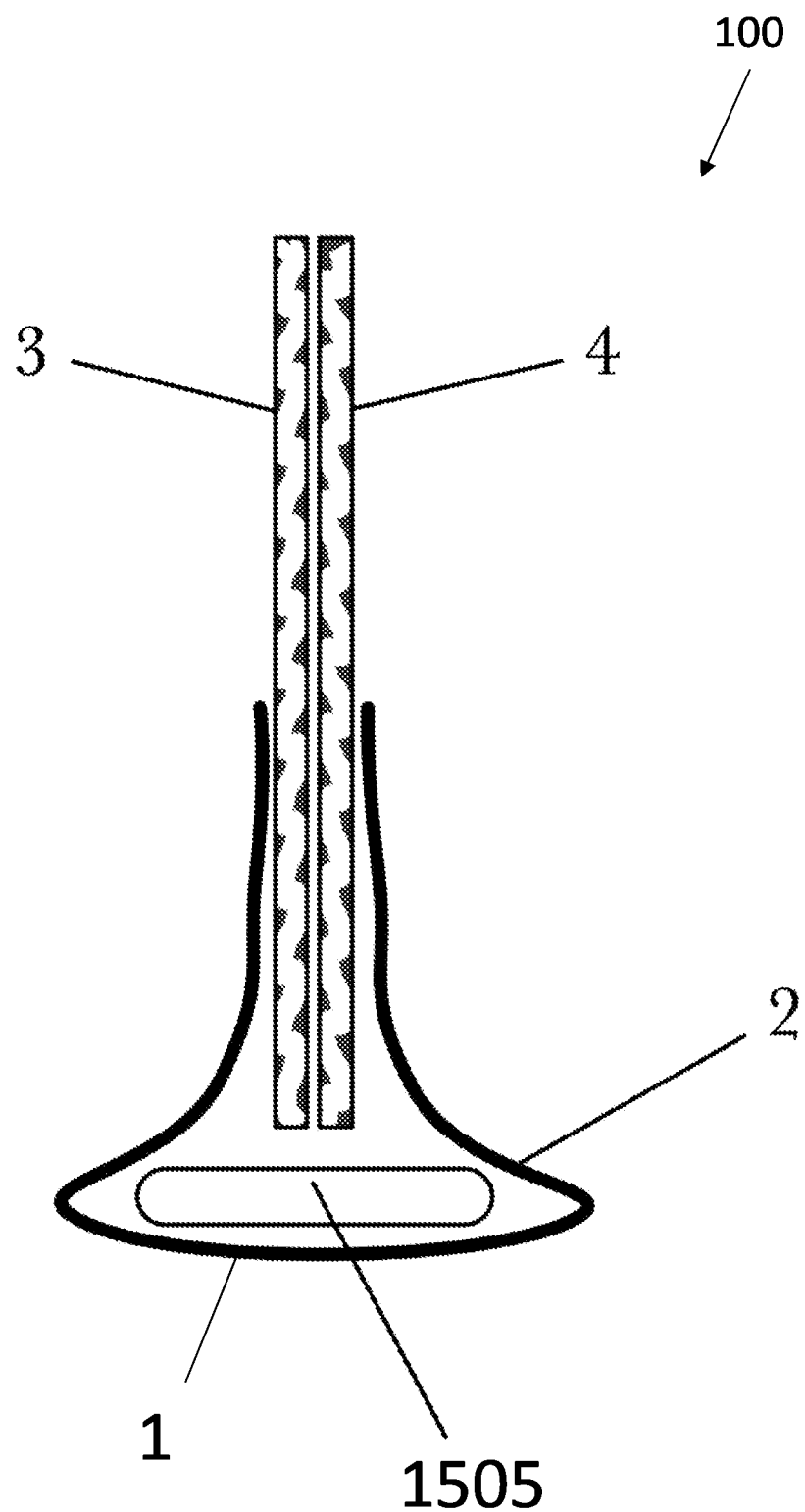
FIG. 16 shows a sectional schematic view of a portion of an exemplary chair-mounted screen in accordance with additional aspects of the disclosure.

FIG. 16 shows a schematic partial cross section view of an exemplary chair-mounted screen 100 in accordance with additional aspects of the disclosure. As shown in FIG. 16, the screen 100 includes a "front" material 3 and a "rear" material 4 (which may be fabrics, and may be different from one another). As shown in FIG. 16, a securing material 2 (which may be a fabric) is arranged around and fastened to the frame 1 to pull front material 3 and rear material 4 taut. The securing fabric 2 is secured to the front material 3 and rear material 4 (e.g., stitched through both sides of the securing material 2 and through the front material 3 and rear material 4) around the entire circumferential (or perimeter) length of the bendable material 1505, in order to secure the securing material 2 to the bendable material 1505 (and with the stitching within the frame 1). In accordance with aspects of the disclosure, this ensures that the front material 3 and rear material 4 are pulled taut and are flat when the frame 1 is open. Additionally, as shown in FIG. 15, a hoop- (or loop-) shaped hanging attachment 13 is connected (e.g., stitched) to the frame 1 at a top of the frame 1 (e.g., stitched within the circumferential material 2).

Figure 17:
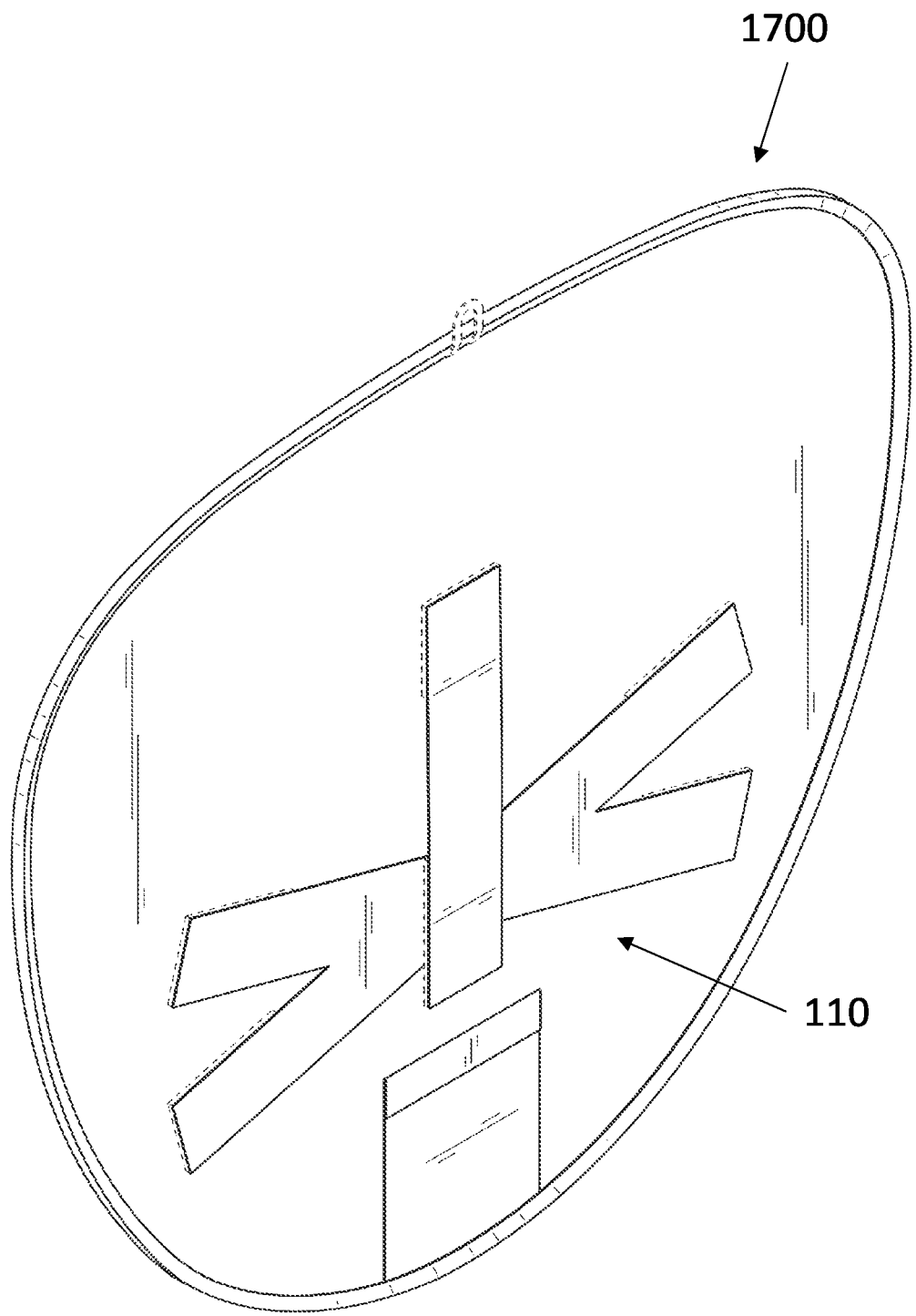
FIG. 17 shows a perspective view of an exemplary chair-mounted screen in a "closed" position in accordance with aspects of the disclosure.

FIG. 17 shows a perspective view of an exemplary chair-mounted screen 1700 in a "closed" position in accordance with aspects of the disclosure. While the exemplary embodiment of FIG. 1 depicts an "upside-down egg" shape or "guitar pick" shape, the embodiment of FIG. 17 shows an exemplary screen having more rounded corners.

In accordance with aspects of the disclosure, it may be beneficial for the screen to have a wider profile at the upper regions of the screen, as this is the height where maximum obscuring by the screen may be desired. In contrast, it may also advantageous for the lower region of the screen to be narrower. For example, as the user may be in a pivoting chair or situated in close confines, a narrower width at the bottom of the screen allows for the chair to move while minimizing the occurrence of the bottom edge of the screen being impacted, and possibly displaced. Thus, as shown with this exemplary embodiments of both FIGS. 1 and 17, the lower region of the screen has a narrower profile and the upper region of the screen has a wider profile.

While the exemplary embodiment of FIG. 17 depicts a "rounded upside-down egg" shape, it should be understood that the disclosure contemplates other the shapes may be used. Circular or square shapes, however, can add excess weight and provide screen space than is necessary. This may lead to the screen being top heavy and/or requiring additional components to stabilize the screen. As such, in accordance with aspects of the disclosure, utilizing a rounded upside-down egg shape or pick-shape (or plectrum-shape) provides the maximum amount of screen at the desired obscuring location, while minimizing excess weight and providing maximum stability. Additionally, this screen is shaped and designed to be shorter on top, helping to further negate any top heaviness that may cause a backwards tilting.

Figure 18:
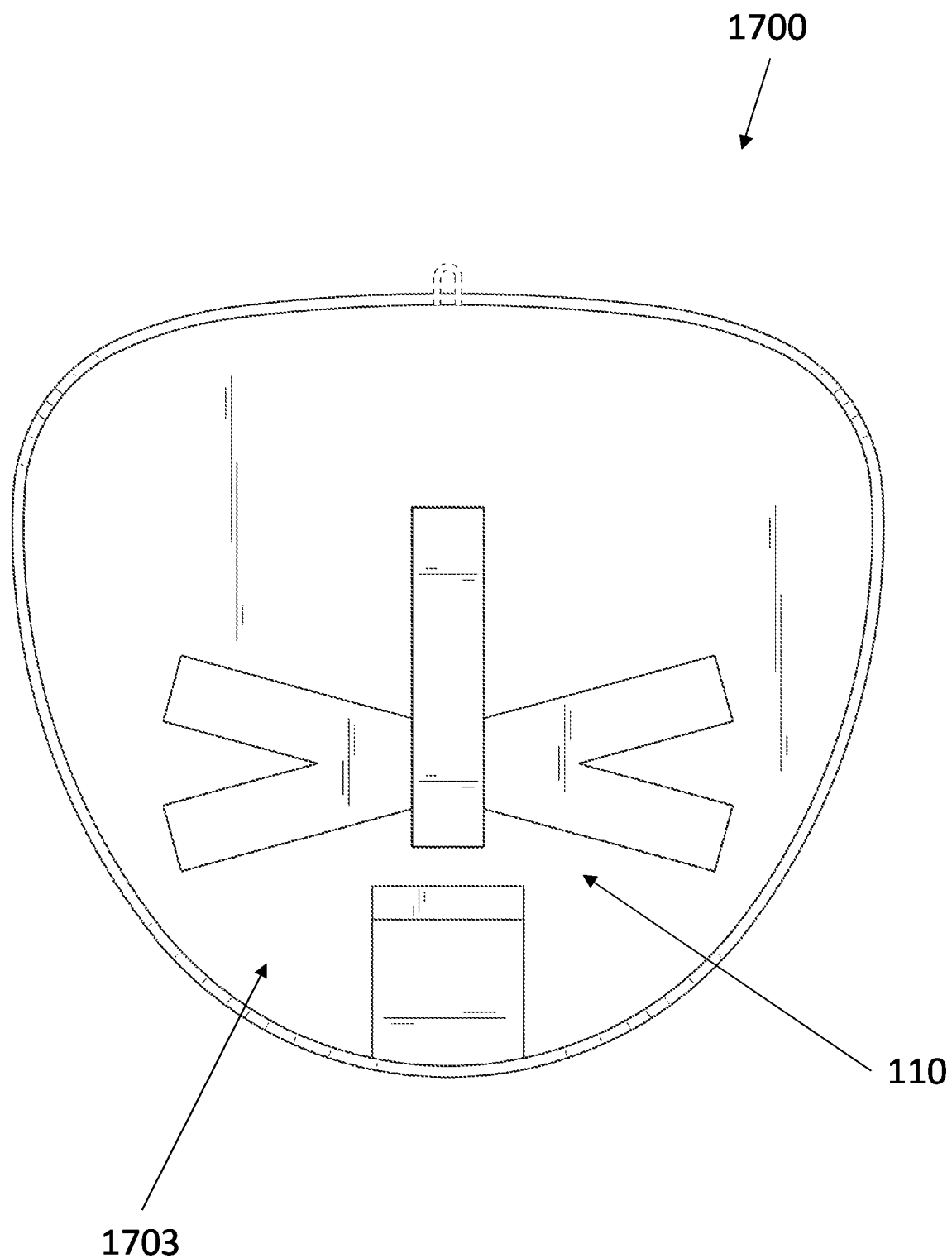
FIG. 18 shows a "front" view of an exemplary chair-mounted screen in a "closed" position in accordance with aspects of the disclosure.
Figure 19:
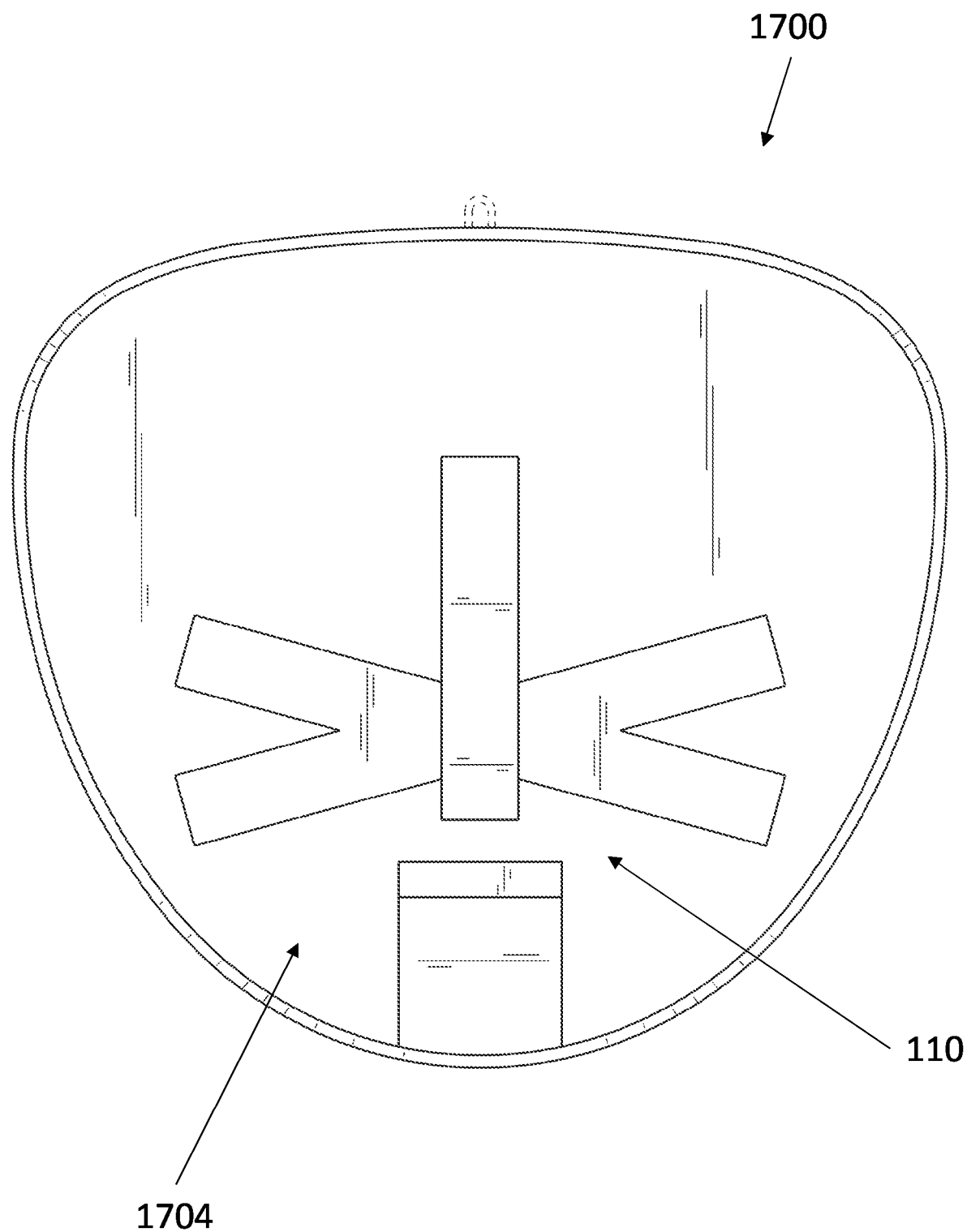
FIG. 19 shows a "back" view of an exemplary chair-mounted screen in a "closed" position in accordance with aspects of the disclosure.

FIG. 18 shows a "front" view of an exemplary chair-mounted screen in a "closed" position in accordance with aspects of the disclosure and FIG. 19 shows a "back" view of an exemplary chair-mounted screen in a "closed" position in accordance with aspects of the disclosure. As can be observed, each of the front and back include a screen material 1703, 1704 and a strap arrangement 110 for reversible mounting of the screen. Each side of the screen 1700 is made of its own piece of screen material 1703 and 1704 (e.g., fabric), usually, but not necessarily required to be, different (e.g., different materials, different colors, other different properties.) In accordance with aspects of the disclosure, not only do the multiple screen materials provide the user the option of having two different colors and/or two different patterns, designs, etc. to be used, the two screen material layers also serve the function of providing additional thickness to block (or reduce) light from bleeding through the screen from behind.

Additionally, the screen need not only be used to block the view from a webcam. For example, the screen may also be used for chroma-keying applications where the color of the screen allows for an image to be virtually projected onto it. Thus, for example, material one side of the screen can be configured as a "green" screen. When the screen is being used as a green screen for chroma-keying and virtual background purposes, light that bleeds through from behind can disturb or minimize the effect. Thus, in accordance with aspects of the disclosure, by utilizing two layers of material (e.g., fabric) the screen eliminates (or minimizes) light bleed, thereby making the screen more effective.

As shown in FIGS. 18 and 19, the screen 1700 includes a strap arrangement 110 on each side of the screen 1700, each of which includes a vertical strap and an X-shaped strap that provides additional stability for the screen 1700. As shown in FIG. 10, the screen 1700 may also include a pocket formed at the bottom of the screen on each side of the screen. In accordance with aspects of the disclosure, as the screen 1700 includes at least two layers of material (e.g., screen materials 1703 and 1704), the multiple layer material significantly reduces the possibility of light seeping through the screen 1700 from behind the screen.

In operation, the screen may be opened up to its uncollapsed and unfolded state. Either side of the screen may then be chosen to face a chair back and slid over the chair back, with the chair back sliding between the x-shaped strap and the screen side. The vertical strap may then be pulled down and secured via the hook and loop fastening material tightly enough to keep the screen upright. If the screen needs additional support to keep it upright an item of suitable thickness can be placed in the pocket at the boom of the screen side in order to push it up against the back portion of the chair seat, thereby tilting the top of the device forward and forcing it upright. Once mounted onto the chair, the user may then place their chair in front of a camera, such as a webcam, thereby blocking out the view of anything behind the device. In the event that the chair back is too wide to slide up into the x-shaped straps without any adjustments, the hook patches at the far edges of the arms that fasten to the respective loop patches on the outside facing plane of the screen side can be unfastened to create additional width and allow for a wider and/or thicker chair back.

Additionally, in the event that the chair back is irregularly shaped, for example, the hook and loop patches on each one of the four arms of the x-shaped strap can be unfastened individually to create a varying width on each corner of the x, allowing for the device to still be mounted stably on an irregularly shaped chair back. In the event that the user needs to use the screen without being mounted on a chair back, the screen can be hung utilizing the hoop or hook at the top of the screen. In this hanging state, the screen is operable to perform the same function of being an obscuring screen (and/or a projection screen).

There can be variation in the types of material or fabric used for the screen sides and/or the straps, and color used for each of these material is variable. The shape and size of the frame is also variable. As noted above, the screen need not be the shape depicted in the drawings, and, for example, could be oval, hexagonal, or another irregular shape. In some embodiments, the frame may not be two dimensional as a flat or planar screen, but rather can extend into the third dimension. For example, the frame can be shaped to bend into the third dimension (for example forwardly backwardly). In embodiments, such a bent frame may be utilized in order to address issues encountered with wide angle lens cameras providing peripheral visibility.

In some embodiments, the frame may use materials other than bendable spring steel, including, for example, any flexible or rigid solid material that can provide a frame to support the other components. In yet further contemplated embodiments, the straps may have a different configuration and/or arrangement. For example, the x-shaped strap could be a v-shaped strap or an upside-down V-shape. The X-shaped strap also need not be a single strap. In other contemplated embodiments the strap arrangement may include two horizontal straps parallel to each other.

In some embodiments, the vertical strap could also be shaped and designed differently similar, or may include more than one vertical strap on each side of the screen. The material and size of the pocket could also be varied and need not be a fixed width or height. The small hoop at the center top could also be two or more small hoops across the top of the screen to provide more points for hanging the screen.

In certain embodiments, the screen may be made with single fabric side instead of two sides. In additional embodiments, the screen materials may not be secured to the frame with a circumferential securing fabric. For example, a screen material may be stretched around and over the top and to the other side of the frame and stitched through the overlapped material from the same piece of fabric.

In further contemplated embodiments, the vertical strap could also be stitched directly to the center of the horizontal x-shaped (or other) strap instead of being adjustable with the hook and loop fastening material.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, be apparent to those of skill in the art upon reviewing the description.

The Abstract of the Disclosure is submitted with the understanding That it will not be used to interpret or limit the scope or meaning of the claims. In addition, in the foregoing Detailed Description of the Embodiments of the Disclosure, various features may be grouped together or described in a single embodiment for the purpose of streamlining the disclosure. This disclosure is not to be interpreted as reflecting an intention that the claimed embodiments require more features than are expressly recited its each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel configuration is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure refers to specific embodiments, those skilled in the art will understand that various changes may be made and equivalents may be substituted for elements thereof without departing from the true spirit and scope of the embodiments of the disclosure. While exemplary embodiments are described above, it is not intended that these embodiments describe all possible forms of the invention. Rather, the words used in the specification are words of description rather than limitation, and it is understood that various changes maybe made without departing from the spirit and scope of the disclosure. In addition, modifications may be made without departing from the essential teachings of the disclosure. Furthermore, the features of various implementing embodiments may be combined to form further embodiments of the disclosure.

What is claimed is:

1. A chair-mountable screen, comprising:
   a screen frame defining a perimeter of the screen;
   at least one screen material supported by the screen frame;
   a strap arrangement fastened on each of the at least one screen material,
   wherein the strap arrangement is adjustably-attachable to the at least one screen material to create a selectively-sized gap between the at least one screen material and the strap arrangement,
   wherein the strap arrangement comprises a vertical strap and a horizontally-arranged strap, wherein the vertical strap includes an upper terminal end fixedly attached to the at least one screen material, and
   wherein the horizontally-arranged strap is an X-shaped strap, having a center region and four terminal arms extending from the center region.

2. The chair-mountable screen according to claim 1, wherein the strap arrangement has a fixed length.

3. The chair-mountable screen according to claim 1, wherein the strap arrangement is non-elastic.

4. The chair-mountable screen according to claim 1, wherein the X-shaped strap is fixedly attached to the at least one screen material at distal ends of each of the four terminal arms.

5. The chair-mountable screen according to claim 1, wherein the X-shaped strap is fixedly attached to the at least one screen material at distal ends of only two of the four terminal arms.

6. The chair-mountable screen according to claim 1, wherein the X-shaped strap is selectively releaseably attached to the at least one screen material along portions of each of the four terminal arms inwardly of the distal ends.

7. The chair-mountable screen according to claim 6, wherein the X-shaped strap is selectively releaseably attached to the at least one screen material via hook and loop fastener.

8. The chair-mountable screen according to claim 1, wherein the X-shaped strap includes a fastening material arranged on an outward surface of the center region,
   the vertical strap includes a corresponding fastening material extending from below the upper terminal end towards a lower terminal end of the vertical strap on an inner facing surface of the vertical strap, and
   the fastening material and corresponding fastening material are operable to fasten to one another to retain the vertical strap in position on the X-shaped strap.

9. The chair-mountable screen according to claim 1, wherein the vertical strap is selectively releaseably attached to the at least one screen material below the upper terminal end via hook and loop fastener.

10. The chair-mountable screen according to claim 1, further comprising a pocket arranged on the at least one screen material at a lower end of the screen.

11. The chair-mountable screen according to claim 1, wherein the at least one screen material comprises two screen materials, each with a respective one of the strap arrangements.

12. The chair-mountable screen according to claim 11, wherein the respective strap arrangements are fastened to each other through the two screen materials.

13. The chair-mountable screen according to claim 11, wherein the two screen materials have differing screen properties from one another.

14. The chair-mountable screen according to claim 1, wherein the perimeter of the screen has a guitar pick shape having a wider upper end and a narrower lower end.

15. The chair-mountable screen according to claim 1, further comprising at least one hanging arrangement having a loop structure at an upper end of the screen, wherein the hanging arrangement is operable to support the screen in a hanging orientation.

16. The chair-mountable screen according to claim 1, wherein the selectively-sized gap is formed by the X-shaped strap being selectively attached to the screen material along certain portions of each of the four terminal arms inwardly of the distal ends.

17. The chair-mountable screen according to claim 1, wherein the X-shaped strap is operable to form the selectively-sized gap such that the X-shaped strap applies tension force to the screen in a direction approximately orthogonal to the screen.

18. A method of configuring a chair-mountable screen for mounting to a chair, the chair-mountable screen comprising: a screen frame defining a perimeter of the screen; at least one screen material supported by the screen frame; a strap arrangement fastened on each of the at least one screen material, wherein the strap arrangement comprises a vertical strap and a horizontally-arranged X-shaped strap having a center region and four terminal arms extending from the center region, wherein the X-shaped strap includes each of the four terminal arms having distal ends and portions of each of the four terminal arms inwardly of the distal ends are selectively releaseably attachable to the screen material via hook and loop fastener, and wherein the strap arrangement is operable to create a selectively-sized gap between the screen material and the strap arrangement, the method comprising:

forming the selectively-sized gap by fastening select portions of one or more of the four terminal arms inwardly of the distal ends to the at least one screen material via the hook and loop fastener.

* * * * *